US008805865B2

(12) United States Patent
Samari et al.

(10) Patent No.: US 8,805,865 B2
(45) Date of Patent: Aug. 12, 2014

(54) EFFICIENT MATCHING OF DATA

(71) Applicant: Juked, Inc., New York, NY (US)

(72) Inventors: Ravosh Samari, Calgary (CA); Paymaan Behrouzi, Airdrie (CA); Shane Campbell, New York City, NY (US)

(73) Assignee: Juked, Inc., New York, NY (US)

( * ) Notice: Subject to any disclaimer, the term of this patent is extended or adjusted under 35 U.S.C. 154(b) by 0 days.

(21) Appl. No.: 13/652,325

(22) Filed: Oct. 15, 2012

(65) Prior Publication Data

US 2014/0108441 A1 Apr. 17, 2014

(51) Int. Cl.
*G06F 17/30* (2006.01)

(52) U.S. Cl.
CPC .... *G06F 17/30864* (2013.01); *G06F 17/30156* (2013.01)
USPC .................... 707/758; 707/780; 707/E17.014; 725/19; 725/20; 725/21; 382/28; 382/115; 382/124

(58) Field of Classification Search
CPC .......... G06F 17/30864; G06F 3/04842; G06F 9/541; G06F 17/30156; G06F 21/32; G06F 21/64; G06F 17/30067; G06F 17/3025; G06F 17/3051; G06K 19/02; G06K 19/06009; G06K 19/06196; G06K 7/00; G06K 9/00711; G06T 17/05
USPC ............ 707/758, 780, 754; 382/28, 115, 124; 725/9, 19, 20, 21
See application file for complete search history.

(56) References Cited

U.S. PATENT DOCUMENTS

| | | | | |
|---|---|---|---|---|
| 4,955,070 | A | 9/1990 | Welsh et al. | |
| 6,085,066 | A * | 7/2000 | Fong | 725/18 |
| 6,766,040 | B1 * | 7/2004 | Catalano et al. | 382/115 |
| 6,778,687 | B2 * | 8/2004 | Sanders et al. | 382/125 |
| 6,970,583 | B2 * | 11/2005 | Black | 382/124 |
| 7,502,941 | B2 * | 3/2009 | Michael et al. | 713/189 |

(Continued)

FOREIGN PATENT DOCUMENTS

WO WO 2012/102404 9/2010

OTHER PUBLICATIONS

Lawrence L. You, Kristal T. Pollack, Darrell D. E. Long, and K. Gopinath—"PRESIDIO: A Framework for Efficient Archival Data Storage"—Journal ACM Transactions on Storage (TOS) TOS, vol. 7 Issue 2, Jul. 2011, Article No. 6 (pp. 6:1-6:60).*

(Continued)

*Primary Examiner* — Anh Ly
(74) *Attorney, Agent, or Firm* — Baker & Hostetler LLP

(57) ABSTRACT

Technologies are disclosed for enabling users to comprehensively determine their exposures to media and to receive services based thereon. For example, an application can be executed on a computing device associated with a user. The application can continuously monitor audio data that the computing device is exposed to and can generate digital signatures thereof. The digital signatures can be transmitted to a server that comprises a database of reference digital signatures and circuitry configured to compare and match the received digital signatures and the reference digital signatures. When a match is found, the server retrieves information associated with the matched reference digital signature and returns, to the device, the retrieved information. The server can also concatenate matches associated with data received from a plurality of computing devices and provide the concatenated data to a third party, who in turn, returns services to the users based on the received data.

41 Claims, 29 Drawing Sheets

(56) References Cited

U.S. PATENT DOCUMENTS

| | | | | |
|---|---|---|---|---|
| 7,565,327 | B2 * | 7/2009 | Schmelzer | 725/105 |
| 8,077,933 | B1 * | 12/2011 | Fiske | 382/124 |
| 8,666,998 | B2 * | 3/2014 | Nelke et al. | 707/758 |
| 2006/0294537 | A1 * | 12/2006 | Weinblatt | 725/10 |
| 2007/0168409 | A1 | 7/2007 | Cheung | |
| 2007/0199013 | A1 * | 8/2007 | Samari et al. | 725/20 |
| 2008/0181492 | A1 * | 7/2008 | Abe et al. | 382/165 |
| 2008/0212846 | A1 * | 9/2008 | Yamamoto et al. | 382/115 |
| 2009/0009488 | A1 * | 1/2009 | D'Souza et al. | 382/124 |
| 2009/0324026 | A1 * | 12/2009 | Kletter | 382/124 |
| 2010/0049711 | A1 * | 2/2010 | Singh et al. | 707/E17.014 |
| 2010/0114991 | A1 * | 5/2010 | Chaudhary et al. | 707/809 |
| 2011/0026849 | A1 * | 2/2011 | Kameyama | 382/260 |
| 2011/0122255 | A1 * | 5/2011 | Haritaoglu | 348/180 |
| 2011/0289121 | A1 * | 11/2011 | Pirkner | 707/805 |
| 2012/0002806 | A1 | 1/2012 | Samari et al. | |
| 2012/0029670 | A1 | 2/2012 | Mont-Reynaud et al. | |
| 2012/0079175 | A1 * | 3/2012 | Flynn et al. | 711/103 |
| 2012/0117584 | A1 * | 5/2012 | Gordon | 725/19 |
| 2012/0191670 | A1 * | 7/2012 | Kennedy et al. | 707/692 |
| 2012/0239175 | A1 | 9/2012 | Mohajer et al. | |
| 2012/0239690 | A1 | 9/2012 | Asikainen et al. | |
| 2013/0097008 | A1 * | 4/2013 | Kaniel | 705/14.41 |
| 2013/0204889 | A1 * | 8/2013 | Sinha et al. | 707/758 |
| 2013/0208942 | A1 * | 8/2013 | Davis | 382/100 |
| 2013/0275421 | A1 * | 10/2013 | Resch et al. | 707/725 |
| 2013/0276138 | A1 * | 10/2013 | Schmelzer | 726/27 |
| 2014/0074804 | A1 * | 3/2014 | Colgrove et al. | 707/692 |

OTHER PUBLICATIONS

Ercal, F.; Allen, M. ; and Feng, H.—"A systolic algorithm to process compressed binary images"—Parallel Processing, 1999. 13th International and 10th Symposium on Parallel and Distributed Processing, 1999. 1999 IPPS/SPDP. Proceedings—Apr. 12-16, 1999 pp. 477-484.*

U.S. Appl. No. 13/652,276, filed Oct. 15, 2012, Samari.

U.S. Appl. No. 13/652,306, filed Oct. 15, 2012, Samari.

International Patent Application No. PCT/US2013/064664: International Search Report dated Dec. 20, 2013, 11 pages.

* cited by examiner

| Comparison Value | Similarity Weight |
|---|---|
| 0 | 10,000 |
| 1 | 6,000 |
| 2 | 2,000 |
| | |
| (k-m) | 25 |

Look-up Table
(2300)

Window Weight
Histogram (2400)

(A)

| | | | | | | |
|---|---|---|---|---|---|---|
| Meter Window (2201) | 15,000 | 0 | 0 | 0 | 0 | 0 |
| Processed | 10 | 0 | 0 | 0 | 0 | 0 |

| | | | | | | |
|---|---|---|---|---|---|---|
| Meter Window (2202) | -1 | 15,000 | 0 | 0 | 0 | 0 |
| Processed | 0 | 10 | 0 | 0 | 0 | 0 |

| | | | | | | |
|---|---|---|---|---|---|---|
| Meter Window (2203) | 2,000 | -1 | 15,000 | 0 | 0 | 0 |
| Processed | 10 | 0 | 10 | 0 | 0 | 0 |

(B)

| | | | | | | |
|---|---|---|---|---|---|---|
| Meter Window (2204) | 200,100 | 2,000 | -1 | 15,000 | 0 | 0 |
| Processed | 5 | 10 | 0 | 10 | 0 | 0 |

| | | | | | | |
|---|---|---|---|---|---|---|
| Meter Window (2205) | 200 | 30,000 | 2,000 | -1 | 15,000 | 0 |
| Processed | 10 | 5 | 10 | 0 | 10 | 0 |

| | | | | | | |
|---|---|---|---|---|---|---|
| Meter Window (2206) | 500 | 200 | 30,000 | 2,000 | -1 | 15,000 |
| Processed | 10 | 10 | 5 | 10 | 0 | 10 |

| Number of Occurrences | Weight Threshold |
|---|---|
| 1 | 50,000 |
| 2 | 30,000 |
| 3 | 18,000 |
| 4 | 8,000 |
| 5 | 1,000 |

Look-up Table
(2600)

FIG. 26

| Number of Occurrences | Weight Threshold |
|---|---|
| 1 | 100,000 |
| 2 | 60,000 |
| 3 | 30,000 |
| 4 | 20,000 |

Look-up Table
(2700)

FIG. 27

EFFICIENT MATCHING OF DATA

CROSS REFERENCE TO RELATED APPLICATIONS

This application is related by subject matter to that which is disclosed in the following commonly assigned applications: U.S. patent application Ser. No. 13/652,276, filed Oct. 15, 2012, entitled "Continuous Monitoring of Data Exposure and Providing Service Related Thereto," and U.S. patent application Ser. No. 13/652,306, filed Oct. 15, 2012, entitled "Efficient Data Fingerprinting," the entirety of each application being hereby incorporated by reference herein.

TECHNICAL FIELD

The disclosure relates to digital signatures, for instance audio signatures, and to systems, methods, and computer readable media for generating and comparing digital signatures and for providing services based thereon.

BACKGROUND

A person is exposed to various audio, video, and signal sources over time. For example, the person may listen to a radio station in the morning, attend a conference during the work day, watch a television show in the evening, and participate in a social gathering at night. Throughout these different activities, the person can actively listen to audio signals by, for example, tuning to a talk show broadcasted over the radio station. The person can also passively hear audio signals by, for example, being unaware of the background music played at the conference. Regardless of whether the exposure is active or passive, the person may be interested in a persistent or continuous monitoring of the signals. This monitoring allows the person to increase his or her environmental awareness of the signals he or she is actually exposed to in comparison to the signals he or she likes to be exposed to. For example, if the person dislikes a certain music genre and becomes aware that a frequently visited coffee shop plays that genre, the person is empowered to frequent a different coffee house. Additionally, the person may also be interested in receiving specific services based on the exposure. For example, if the person is a fan of a certain television show, he or she may be interested in receiving merchandise related thereto.

Current techniques do not allow this type of continuous monitoring and services derived therefrom. For example, when the person is actively listening to a song, the person can record the song on a piece of paper or via an electronic device. If the person is not familiar with the song, the person can activate a song recognition application running on an electronic device. However, such techniques require the person's active input to monitor each song he or she is actively listening to. Thus, these techniques are prone to errors and become prohibitive when monitoring songs over time. Additionally, these techniques do not allow the monitoring of signals that the person is passively exposed to.

Other current techniques that do not involve active input from the person have been used but present many disadvantages. For example, audience measurement systems for measuring television or radio audiences make use of so-called meters installed in a panel of households that are generally chosen such that their occupants are demographically representative of the potential audience population as a whole. The meters are devices that monitor and record information related to channels, stations, or programs selected for viewing or listening on a television or radio in the household. The meters report the information to a central office that has access to reference information related to all channels, stations, or programs available for viewing. The central office can compare the received household information to the reference information to determine the exposure of the audience, as a whole, to the channels, stations, or programs. However, the use of meters is costly and invasive as it requires dedicated circuitry installed in the households. Additionally, the monitoring is limited to exposures at the households and, thus, produces incomplete data.

Even, when a meter is designed as a personal electronic device that can be attached to a user, the meter needs to be reliable. Otherwise, inaccurate data is generated. When the number of deployed personal electronic device-like meters increase, the size of the data generated by the meters and the size of the data received, searched, and compared at the central office increase drastically. This increase in data size limits the number of deployable meters and truncates the data collected at each meter, which results in an incomplete data set and in an inability to provide personal services based on individual exposures.

SUMMARY

In various embodiments, systems, methods, and computer readable media are disclosed for persistently and continuously monitoring data received at an electronic device, generating digital signatures identifying the received data, and providing services based on a comparison of the digital signatures.

In an embodiment, the electronic device, such as a smartphone, can be configured to run an application that recognizes data exposure in real time and on a 24/7 basis. The data can comprise any media that has a sound or audio component such as radio and television broadcasts, internet streaming, songs in a store advertisement, media played on mobile devices, movies, commercials, advertisements, trailers, background noise, conversations, etc. This configuration allows the electronic device to persistently and continuously monitor the data and to produce a complete timeline of the data exposure.

In an embodiment, the application automatically listens and recognizes media and allows a user to share the media exposure with friends through social networks and to receive notifications and view timelines of other users. Once the application is executed on the electronic device, the application runs in the device's foreground or background and does not require additional user input to collect and process the detected media. The application can also capture valuable usage information by user demographics.

In an embodiment, the application processes the media received at the electronic device to create digital signatures associated with the media. The digital signatures comprise bit streams, fingerprints, or a combination thereof. A bit stream can be associated with a number of media that the electronic device is exposed to, such as a plurality of songs. In comparison, a fingerprint can be associated with a media from the number of media, such as a song from the plurality of songs. The digital signatures along with additional data can be transmitted to a server for processing. The additional data can comprise information related to the electronic device and to a user thereof.

In an embodiment, the server receives the bit stream from the electronic device and derives fingerprints thereof. In an alternate embodiment, the server receives the fingerprints directly from the electronic device. In one example, the server comprises Field Programmable Gate Arrays (FPGAs) configured to compare the received digital signatures for similarity against a database of reference digital signatures associated with reference data. The server detects matches between the received and reference digital signatures, even when the received digital signatures are associated with data that suffered from distortion when it was received at the electronic device. Thereafter, the server returns information associated with the matches to the electronic device and provides additional services thereto based on the received additional data. Further, the server analyzes the matches and the additional data to derive usage information associated with user behavior and provides such information to the electronic device and to third parties.

In comparison to existing techniques, the various embodiments allow digital signatures to be generated with a much smaller data size. For example, every two seconds of audio can be represented with an 80 bit digital signature. The small data size allows the electronic device to continuously monitor, on a 24/7 basis, media received thereat. The small data size also allows the server to compare and match sets of digital signatures associated with a large user base and a wealth of reference media.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The systems, methods, and computer media for generating and comparing digital signatures and for providing services based thereon in accordance with this specification are further described with reference to the accompanying drawings in which:

FIG. 3 depicts an example of data sources and data types that an electronic device can be exposed to.

FIGS. 26-27 depict example look-up tables used by a sliding window for determining matches between meter and reference fingerprints.

DETAILED DESCRIPTION OF ILLUSTRATIVE EMBODIMENTS

Figure 1A:
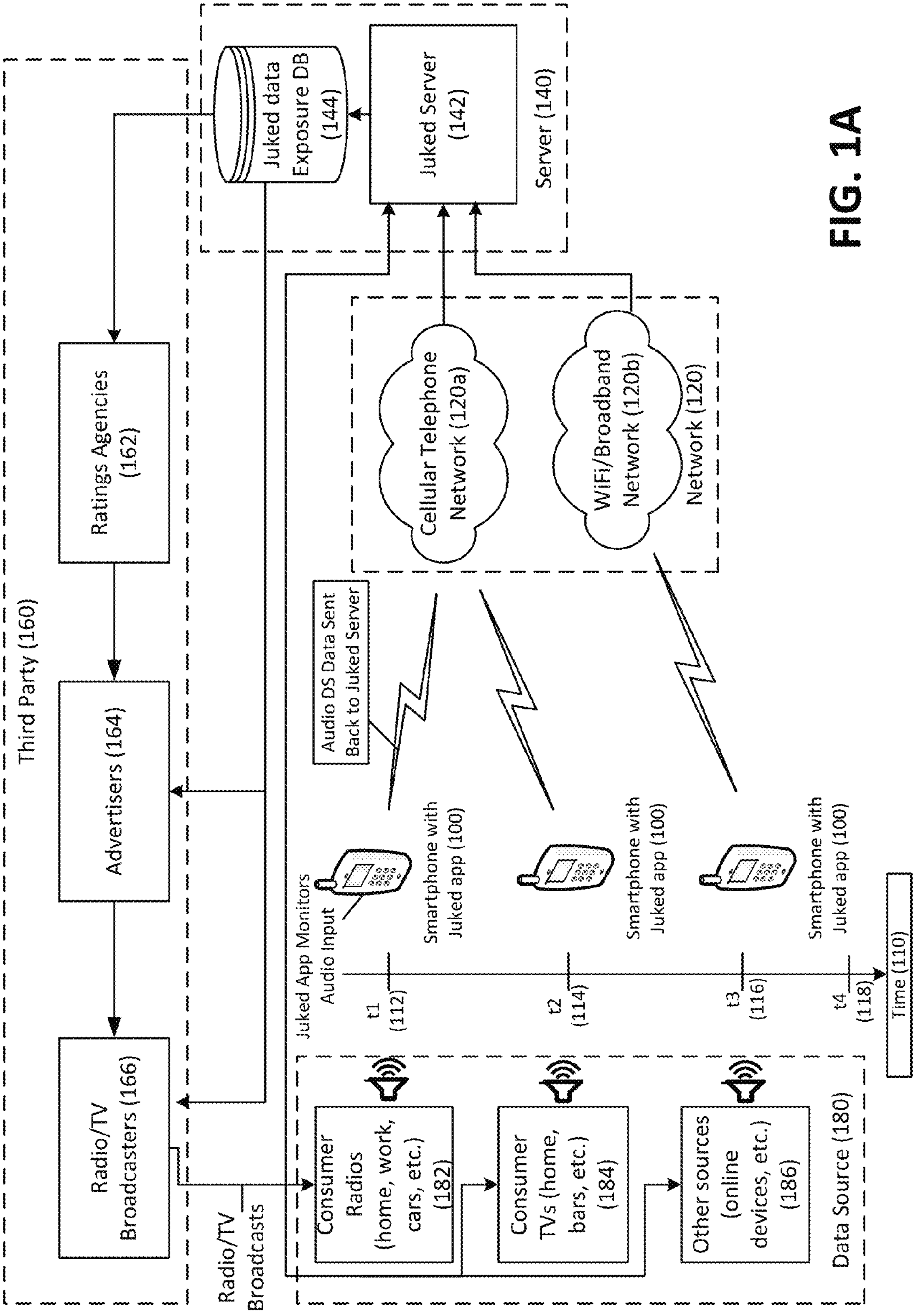
FIGS. 1A-C depict an example end-to-end system wherein aspects of the present disclosure can be implemented.

Specific details are set forth in the following description and figures to provide a thorough understanding of various embodiments of the disclosure. In the drawings, similar symbols identify similar components, unless context dictates otherwise. Certain well-known technology details, such as computing and software technologies, are not set forth in the following description to avoid unnecessarily obscuring the various embodiments. Those of ordinary skill in the relevant art will understand that they can practice other embodiments of the disclosure without departing from the scope of the subject matter presented herein. Finally, the various techniques described herein can be implemented in hardware, software, or a combination thereof.

FIG. 1A depicts an example end-to-end system wherein aspects of the present disclosure can be implemented. In a basic configuration, the system comprises a personal electronic device 100, a network 120, a server 140, a third party 160, and a data source 180. The personal electronic device 100 comprises a smartphone configured with a JUKED application. The personal electronic device 100 may also comprise other type of electronic devices, such as a desktop computer, a laptop computer, a tablet computer, or any type of general or specialized computing devices.

The network 120 comprises a communications network of any type that is suitable for providing communications between the personal electronic device 100 and the server 120 and may comprise a combination of discrete networks which may use different technologies. For example, the communications network 120 comprises a cellular network 120*a*, a WiFi/broadband network 120*b*, a local area network (LAN), a wide area network (WAN), a telephony network, a fiber-optic network, or combinations thereof. In an example embodiment, the WiFi/broadband network 120*b* comprises the Internet and any networks adapted to communicate with the Internet. The communications network 120 may be also configured as a means for transmitting data between any of the components of the end-to-end system, such as between the personal electronic device 100, the server 140, the third party 160, and the data source 180.

The server 140 comprises a JUKED server 142 coupled to a JUKED data exposure database 144. In an embodiment, the JUKED server 142 comprises a memory that stores the JUKED data exposure database 144. The JUKED server 142 can also comprise field-programmable gate arrays configured to process data received from the personal electronic device 110 and to compare the received data to reference data stored at the server 140. The comparison results in determining the exposure of the personal electronic device 100 to data received from the data source 180. This data exposure is stored in the JUKED data exposure database 144. In return, the server 140 provides the personal electronic device 100 with information and services based on the data exposure.

In a further embodiment, the server 140 can be in communication with the third party 160 and the data source 180. The server 140 provides the third party 160 with information related to the data exposure, the personal electronic device 100, and a user associated with the personal electronic device 100. The information provided to the third party 160 is restricted to information that meets privacy limitations as set by the user of the electronic device 100 and any regulatory requirements. The server 140 also receives data from the data source 180. The data can be processed to create the reference data stored at the server 140. The reference data can also be received directly from the data source 180 or from the third party 160.

The third party 160 comprises any of rating agencies 162, advertisers 164, radio and television broadcasters 166, and other parties such as a government body, product and service companies, consulting firms, etc. The third party 160 receives information from the server 140 and provides, in return, services to the personal electronic device 110. The services include, for example, advertisements, offers, rewards, loyalty programs, etc. that are personalized or customized based on the received information from the server 140. The services can be directly provided to the personal electronic device 110 or can be channeled to the personal electronic device 110 through the server 140. The third party 160 can also provide services to the server 140. For example, the radio and television broadcasters 166 can provide the server 140 with information related to broadcasted data, such as songs and shows. The server 140 uses the information received from the third party 160 to create, update, or further refine the reference data.

The data source 180 comprises consumer radios 182, consumer televisions, 184, and other sources 186. The data broadcasted from the data source 180 can comprise any media that has a sound or audio component. The consumer radios 182 comprise radios installed at homes, work, cars, and other locations associated with or visited by the user of the personal electronic device 110. Likewise, the consumer televisions 184 comprises televisions installed at homes, bars, and other venues associated with or visited by the user. The other sources 186 comprise any other source of data that can be broadcasted and detected at the personal electronic device 100. For example, the other sources 186 can comprise online streaming devices. The data source 180 can also be in communication with the third party 160. For example, the radio and television broadcasters 166 can use the consumer radios 182 and the consumer televisions 184 as outlets to broadcast radio and television signals to the personal electronic device 100. The data source 180 can additionally provide information to the server 140 to create, update, or further refine the reference data.

In an embodiment, the JUKED application can be downloaded to the smartphone from the JUKED server or from any other online server, such as the App Store® or Google Play®. The JUKED application comprises a set of instructions that configure the smartphone to continuously monitor the data received at the smartphone, turning in effect the smartphone into a meter that measures, for example, media received thereat in real time and on a 24/7 basis. After initial set-up, the application can run in the foreground or background of the smartphone independently of any input from the user of the smartphone. As the data exposure changes over time when, for example, the media received from a same data source changes or the user receives media from a different data source, the application automatically listens and recognizes the media by using digital signatures. In an embodiment, the application generates the digital signatures without storing the media. The digital signatures are compared to reference digital signatures associated with reference media to identify matches therebetween. The matches are used to identify the data exposure or the media that the smartphone was exposed to over time.

For example, starting at time t1 112, the smartphone may be exposed to audio broadcasts from the consumer radios 182 until the smartphone becomes exposed to television broadcasts from the consumer televisions 184 at time t2 114. The radio broadcasts may include, for instance, a number of songs and talk shows. The change from radio to television broadcasts may be associated with a relocation of the smartphone between two locations, for example, from a car to a sports bar. Likewise, starting at time t2 114, the smartphone may be exposed to the television broadcasts until the smartphone becomes exposed to online streams from the other sources 186 at time t3 116. The television broadcasts may include, for instance, a number of television shows, a broadcasted football game, and advertisements. The change from television broadcasts to online streams may be associated with a change in the data source without a change in the location of the smartphone. For example, at the sports bar, the television broadcasts may be ceased and replaced with a stream of music from an online radio station starting at time t3 116. Between time t3 116 and a later time t4 118, the smartphone may remain exposed to the online streams, but after time t4 118, the smartphone may no longer be exposed to media from the data source 180. For example, starting at time t4 118, the smartphone may be relocated to a home, where audio detected comprises conversations between residents of the home or noise associated with a sleep time. Times t1 112, t2 114, t3 116, and t4 118 need not be of the same duration.

As the data exposure changes over time, the application automatically processes the respective media to create digital signatures thereof. The digital signatures may comprise bit streams, where each bit stream is associated with the media that the smartphone was exposed to within a certain time period. The time period need not be related to the changes in the data exposure such as the changes associated with times t1 112, t2 114, t3 116, and t4 118. For example, the application may generate a bit stream that is associated with the songs and the talk shows that the smartphone was exposed to between times t1 112 and t2 114 or between a sub-period of time between times t1 112 and t2 114. As such, the generated bit streams are associated with the songs, talk shows, the television shows, the broadcasted football game, the advertisements, the online streams, the conversations, and the noise detected at the smartphone over time. Similarly, the digital signatures may comprise fingerprints, where each fingerprint is associated with the media that the smartphone was exposed to within a certain time period. In a typical scenario, the time period associated with a fingerprint is shorter than the time period associated with a bit stream. For example, the fingerprint can represent an audio signature of a subsection of a song whereas the bit stream can represent an audio signature of the entire song or a plurality of songs. Further, the application can derive the fingerprints from the bit streams and can determine whether to send fingerprints, bit streams, or a combination thereof to the server 140.

In an embodiment, the smartphone detects parameters associated with network and device conditions, feedback received from the server 140, and user activities. The application utilizes the parameters to send the digital signatures to the server 140. For example, the parameters may include instructions from the server 140 to transmit bit streams instead of fingerprints. In turn, the application uses these instructions to generate and transmit bit streams only. The parameters may further include an indication that the cellular telephone network 120*a* is available between times t1 112 and t2 114 and that the WiFi/broadband network 120*b* is available thereafter. The application then directs the smartphone to transmit the digital signatures over the cellular network 120*a* between times t1 112 and t2 114 and over the WiFi/broadband network 120*b* thereafter. Similarly, the parameters may indicate that a battery of the smartphone has a low power charge. In turn, the application directs the smartphone to adjust a rate for transmitting the digital signatures until the battery is recharged or until the smartphone is plugged into a power outlet. The parameters may also include an indication that the user is talking on the smartphone. In response, the application can stop the generation of the digital signatures until the user completes the phone call.

Further, the application may append additional data to the digital signatures for transmission to the server 140. For example, the application may include time stamps associated with the time when the digital signatures were created and context information associated with the smartphone and the user. The context information may comprise, for example, a geographic location of the smartphone associated with the time when the digital signature was created, an internet protocol address of the smartphone, and demographics of the user such as the user's social status, age, interests, residential address, etc.

The server 140 receives the digital signatures from the smartphone and compares the received digital signatures for similarity against reference digital signatures stored in memory associated with the server 140. The reference digital signatures identify reference data or media. In an embodiment, the server 140 derives fingerprints from received bit streams and compares the derived fingerprints to reference fingerprints. Based on the comparison, the server 140 determines matches between the received digital signatures and the reference digital signatures. The server 140 uses the matches to retrieve information about the media associated with the digital signatures. When the server 140 determines a match between a received or derived fingerprint and a reference fingerprint, the server 140 retrieves information associated with the reference fingerprint and associates the retrieved information with the received or derived fingerprint. For example, when the received fingerprint is associated with audio of a song that the smartphone was exposed to, the server 140 uses the matched reference fingerprint to determine the corresponding reference song and retrieves information about the reference song. The information can comprise any of title, album, artist, band, release date, studio house, genre, rating associated with the song and physical and online stores where the song can be purchased. Further, the information can comprise information about the source that broadcasted the matched media such as the name of the radio station. The server 140 returns the information to the application.

Furthermore, the server 140 utilizes the additional appended data to derive additional information and services. The server 140 utilizes the time stamps to return information about the time when each media was detected at the smartphone. For example, the server 140 may determine that a matched song was received at the smartphone between 10:00 am and 10:02 am on Monday and may return such information to the application for display on the smartphone. Similarly, the server 140 utilizes the context information to return additional information to the application. The server 140 may use the location of the smartphone to return information about a venue associated with the location and information about the data source at that venue. For example, the server 140 may send information about the sports bar where the smartphone was located between times t2 114 and t3 116 and that indicates that the source of the media detected is a television set. The server 140 may also use the user context information to return additional services to the application. For example, the server 140 can retrieve a list of songs that users with similar demographics frequently listen to and return the list to the application for suggesting songs that the user may be interested in listening to.

In a further embodiment, the server 140 analyzes the matched digital signatures and the additional information appended to the received digital signatures to determine user usage information. For example, the server 140 can monitor the data exposure over time, apply statistical analysis thereto, and determine, for example, frequencies and durations of each media within the data exposure. The server 140 can return the usage information to the application along with additional services based thereon. For example, if the server 140 detects that the smartphone is frequently exposed to music played by a certain band, the server 140 can send offer for discounted tickets of a concert featuring the music band and held at a location within a certain geographic range from an address associated with the user of the smartphone.

The server 140 can transmit information back to the application in real-time, at intervals, or upon request from the user. For example, as the server 140 receives digital signatures from the smartphone and determines matches therefrom, the server 140 can immediately push the information associated with the matches to the smartphone. Alternatively, the server 140 can collect the information over a period of time and push the information to the smartphone at a certain transmission rate. The period of time and the transmission rate can be adjusted based on parameters associated with the conditions of the server 140, conditions of the network 120, and feedback received from the smartphone. Additionally, the server 140 may store the information and, upon receiving a request from the smartphone, return the information thereto.

The server 140 may also provide the usage information to the third party 160. For example, the server 140 may provide the advertisers 164 with a version of the usage information along with the device context information. In return, the advertisers 164 may create a personalized advertisement based on the received information and return the advertisement to the smartphone. The server 140 may further group usage information associated with various personal electronic devices 100 and users thereof based on the usage information and based on the various device and user context information. For example, the server 140 may group usage information associated with data exposures to radio and television stations and transmit this grouped data to the radio and television broadcasters 166. Additionally, the server 140 may group usage information associated with a certain user demographic and send this grouped information to the advertisers 164. The server 140 may also group usage information associated with a certain geographic location and send this grouped information to the rating agencies 162. In an embodiment, the server 140 can customize usage information based on parameters defined from the third party 160, based on privacy settings predefined by the user of the smartphone, and based on regulatory requirements. For example, the server 140 may receive a request from rating agencies 162 for usage information limited to television shows broadcasted in Alexandria, Va. over a certain holiday period. The server 140, in turn, retrieves the usage information that meets these parameters and transmits the retrieved information to the rating agencies 162. The rating agencies 162 may analyze the received information, rate each television accordingly, and provide the ratings to the advertisers 164 and to the radio and television broadcasters 166. In turn and based on the received ratings, the advertisers 164 may decide to place advertisements within certain television shows and the radio and television broadcasters 162 may decide to update the television broadcasts.

The application processes the information received from the server 140 and displays on the smartphone information associated with the data exposure based on predefined settings. For example, the application may display the list of songs, talk shows, television shows, broadcasted football game, advertisements, and online streams that the smartphone was exposed to between times t1 112 and t4 118. For each matched media within that time frame, the application may also display information specific to the exposure and information related to the media. For example, the application may display a start time and an end time associated with the time when a song is detected at the smartphone. The application may also display for the title, album, artist, band, release date, studio house, genre, rating, vendor locations associated with the song. Further, the application may display information associated with the geographic locations or venues where the data exposure occurred and information associated with the corresponding data source 180. The application may display suggestions for songs that users with similar demographics as the user of the smartphone may be exposed to. The application may also display customized advertisements based on the usage information and received from the server 140 or from the third party 160. The application may also display statistics about usage information and a history of the usage information over time. Further, the application can derive additional services from the usage information. For example, if the application determines that the user frequently watches a television show that is broadcasted on a weekly basis, the application can set-up a calendar reminder to timely notify the user of the broadcasts. As such, the application can provide a comprehensive view of the data that the smartphone is exposed to over time based on the application's continuous and persistent monitoring of such data without an interaction from the user. The application can also provide additional services based on the data exposure and the context information. The comprehensive view and services can be updated in real-time, at intervals, or upon request.

Figure 1B:
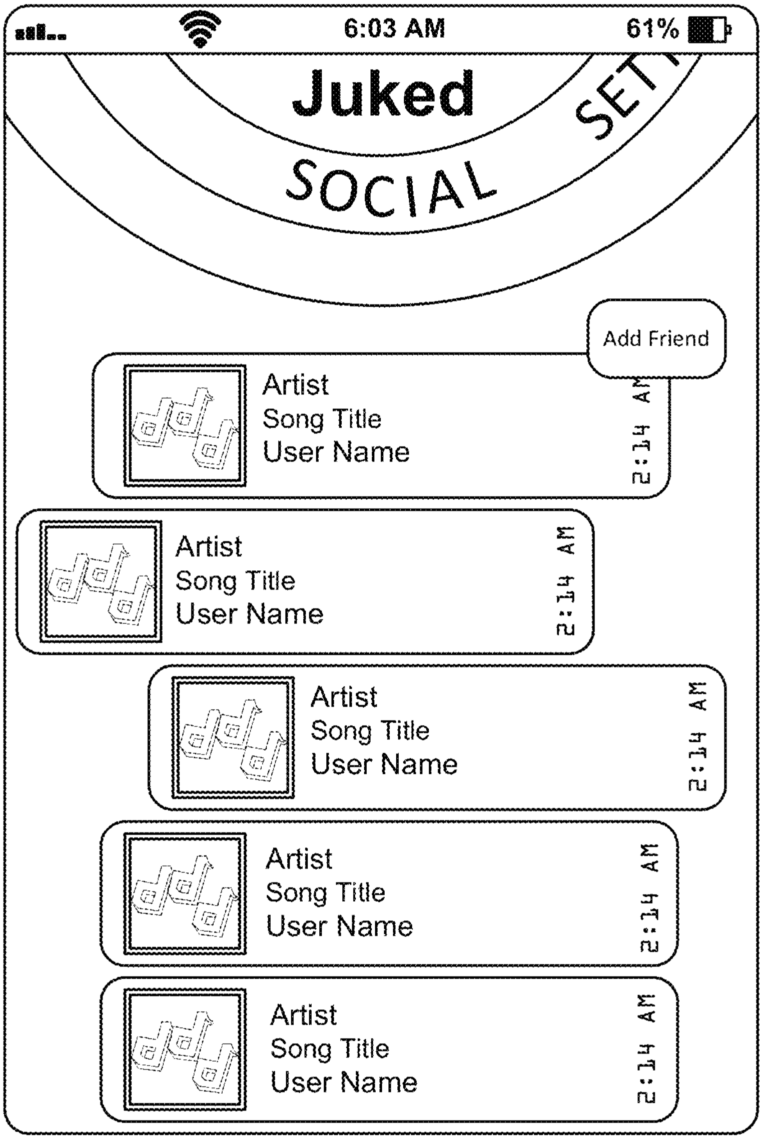

In a further embodiment, the JUKED application comprises instructions that, when executed on the personal electronic device 100, provide a set of functionalities to the user. For example, the functionalities comprise user, social, content interaction, and data transmission functionalities. The user functionality includes ability for the user to control the data acquisition and the privacy settings. For example, the user can select automatic recognition that enables the application to automatically recognize, tag, and display media on the smartphone. Media, such as music, can be displayed as a list via a graphical user interface (GUI) of the application as shown in FIG. 1B.

Figure 1C:
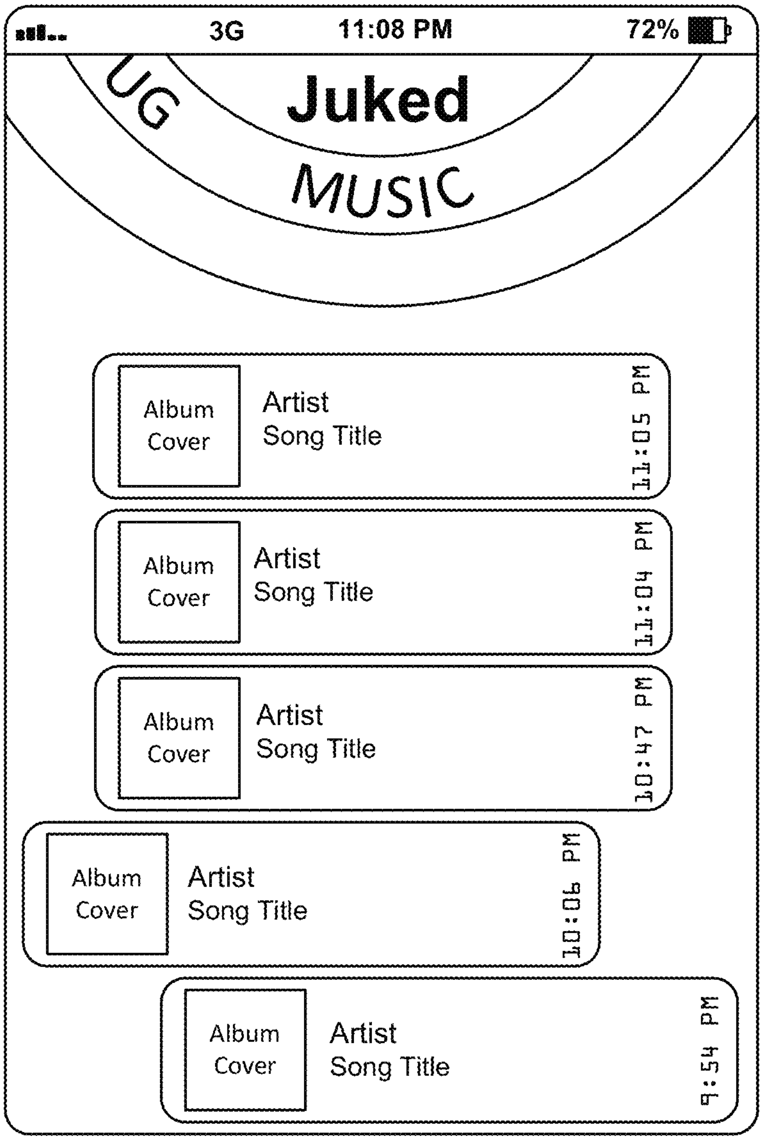

The GUI comprises a menu button 102 and a list of exposed media 104. The menu button 102 can be used to navigate between different menus, submenus, and functions of the application and can be represented in a form of a record disc or a portion thereof. For example, by rotating the menu button 102, the GUI changes the display from the exposed music list, as shown in FIG. 1B, to a social function as will be described herein below and as shown in FIG. 1C. The list 104 provides a timeline of the media exposure and comprises graphical objects associated therewith. Each of the graphical objects can be represented as a slide bar that displays information about the media and the time of the exposure. The information can be derived from metadata associated with a matched song and can comprise, for example, the name of the artist, the name of the song, and the album cover.

The privacy settings allow the user, for example, to share his or her data exposure with friends through social networks such as Facebook® and Twitter®, with the server 140, and also with the third party 160. The user functionality further includes an ability to 'like' or 'dislike' a program or song, to bookmark songs and programs, to receive daily or weekly diary or log on viewing or listening exposure, to purchase and download content from online content providers such as iTunes®, to receive related links to eCommerce websites such Amazon® and eBay®, and to receive relevant informational links for downloads, purchases, and related information. For example, as shown in FIG. 1B, the user can slide the graphical object to one side of the GUI to rate the media with a positive or a "like" rating, to the other side for a negative or a "dislike" rating, or can leave the graphical object in its center position, which indicates that the media is not rated. Even after rating a media, the user can change the position of the associated graphical object to remove or update the rating.

The ability to move the graphical object to provide a rating also comprises the ability to rate media received from the JUKED server 140 or from the third party 160. For example, the third party 160 can transmit a poll to the personal electronic device 100. The poll can be associated with the media exposure at the personal electronic device 100, the context of the personal electronic device 100, and/or the context of the user. For example, when the media exposure comprises a frequent exposure to a particular artist, the poll may include a survey about the latest album of the artist. Likewise, if the media exposure indicates that the user has been listening to political shows about upcoming election and if the user context indicates that the user is of a certain demographic, the poll can comprise an opinion about the election candidates. The user can vote or answer the poll by sliding the graphic objects associated with the poll as described herein above.

The user functionality also includes the ability of the user to start a media player associated with the media exposure. For example, the GUI of the application can be configured to provide an interface to the media player. The user can select any of the media displayed in the list 104, which triggers the media to be played or downloaded. In an embodiment, the media is streamed from the JUKED server 140 or from a third party server. In another embodiment, the media can be downloaded from the JUKED server 140 or from the third party server. In a further embodiment, when the media is downloaded to the personal electronic device 100, the media can be played thereat via the JUKED application or via another media player application executed on the personal electronic device 100. This user functionality may also be associated with a billing model in return for the returned service. For example, an account of the user can be charged on a periodic, per stream, or per download basis.

The social functionality comprises, for example, an ability for the user to update the sharing or check-ins available through the social networks, to receive notifications and view timelines of other JUKED users' media exposure, to view and receive notifications from friends and social network peers on what others are viewing and listening to, to click-through access to share, post, trend, research and purchase related content specific to the media recognized, to interact with other friends and other users watching the same program or listening to similar content, to share likes and dislikes and other comments of shared content, to share the JUKED application with friends, and to compare personal viewing and listening habits with peers and other demographic groups.

As shown in FIG. 1C, the menu button 102 is set to the social function of the application. The list 104 is updated to comprise media that the user can share with his or friends. By sliding the graphical object to one side of the GUI, the user allows the application to share the corresponding media, or information associated with the user's exposure to that media, with the friends. Similarly, by sliding the graphical object to the other side of the GUI, the user indicates that the corresponding data is not to be shared with the friends. By leaving the graphical object in its center position, the user indicates that no decision has been made regarding whether the data is to be shared. The application can treat this indication as an instruction not to share the data. The list of friends that the data will be shared with can be updated via a share button 106. When the share button 106 is selected, a list of contacts can be displayed, allowing the user to select which contact or friend to share the data with.

The content interaction functionality comprises, for example, an ability for the user to accumulate points and rewards for usage and exposure to media content, to participate in user contests, content trivia, polls and other interactive media content, and to receive targeted product and service advertisements, specials and discounts with click through links to related webpages and coupons. The data transmission functionality comprises, for example, abilities for the user to control the duration of the continuous monitoring and the data transmissions over the network 120.

Figure 2:
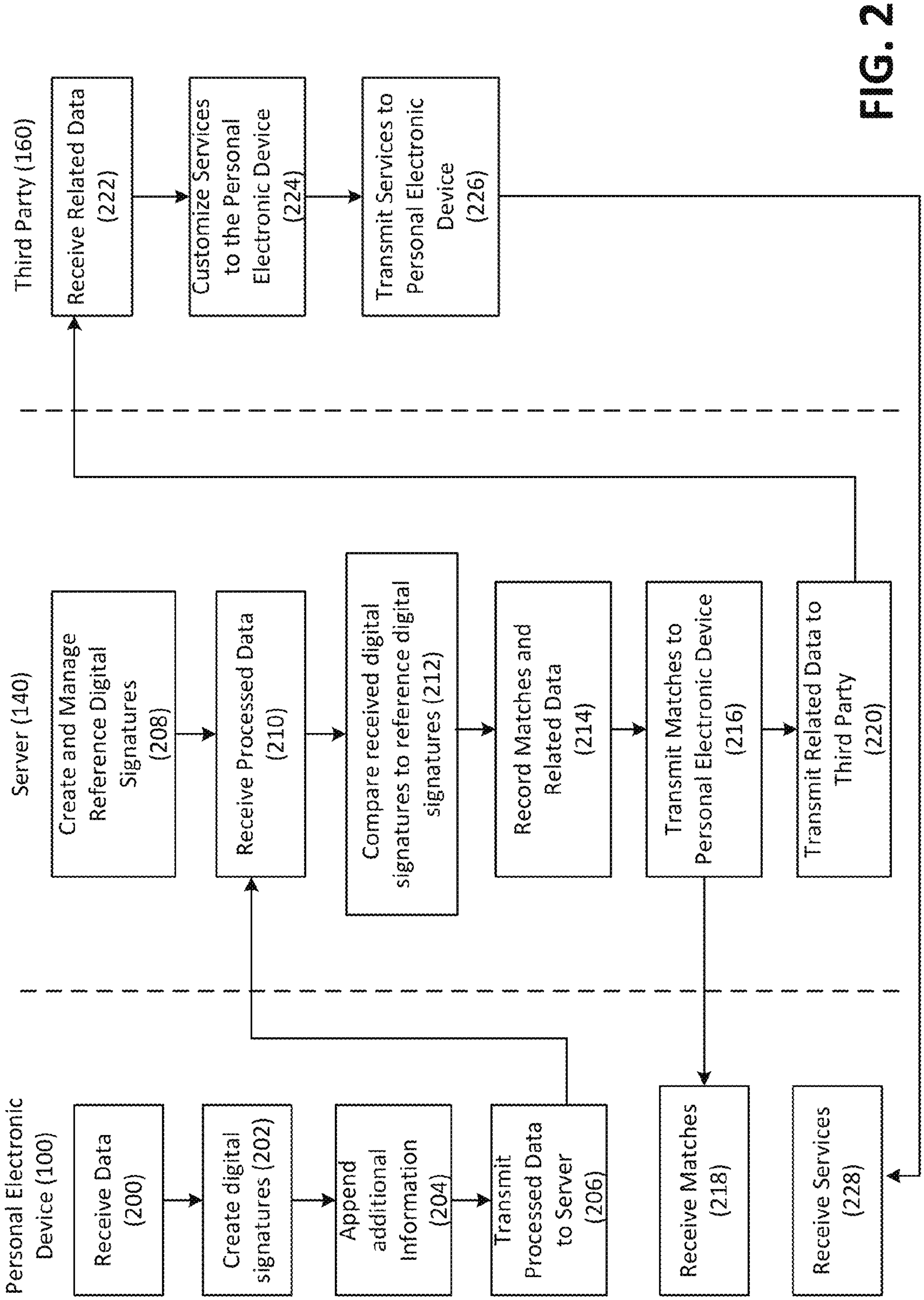
FIG. 2 depicts an example functional flow wherein aspects of the present disclosure can be implemented.

FIG. 2 depicts an example functional flow wherein aspects of the present disclosure can be implemented. More particularly, FIG. 2 provides an illustration of the operations executed at the personal electronic device 100, the server 140, and the third party 160 to generate and compare digital signatures and to provide services based thereon. Operation 200 (receive data 200) illustrates the personal electronic device 100 receiving data from the data source 180 or other sources. The received data corresponds to the data that the personal electronic device 100 is exposed to. The data comprises media with audio content, such as radio and television broadcasts, online streams, speech, conversations, noise, and silence. The received data may also be distorted. In an embodiment, the received data may be data stored on the personal electronic device 100, such as music files thereat. Operation 200 may be followed by operation 202. Operation 202 (create digital signatures) illustrates the personal electronic device 100 creating digital signatures that is associated with the received data. The digital signatures can comprise any of bit streams, fingerprints, or a combination thereof. Operation 200 may be followed by operation 204. Operation 204 (append additional information) illustrates the personal electronic device 100 adding additional information to the digital signatures. The additional information comprises, for example, timestamps, device context information, and user context information. Operation 204 may be followed by operation 206. Operation 206 (transmit processed data to server) illustrates the personal electronic device 100 transmitting the digital signatures and the additional information to the server 140. The transmission can be adjusted based on parameters associated with the user, the personal electronic device 100, the network 120, and the server 140. Operation 206 may be followed by operation 210.

Operation 210 (receive processed data) illustrates the server 140 receiving the digital signatures and the additional information from the personal electronic device 100. Operation 210 may be preceded by operation 208. Operation 208 (create and manage reference digital signatures) illustrates the server 140 creating and managing reference digital signatures. The reference digital signatures can be derived from and can identify reference data that includes, for example, reference media with audio content. The reference digital signatures can also be received from the third party 160 or can be updated with information received from the third party 160. The reference digital signatures can be stored in a memory coupled to the server 140. Operations 208 and 210 may be followed by operation 212. Operation 212 (compare received digital signatures to reference digital signatures) illustrates the server 140 comparing the received digital signatures for similarity against the reference digital signatures. When the comparison between a received digital signature and a reference digital signature meets a predefined threshold, the server 140 determines that there is a match between the received digital signature and the reference digital signature. Operation 212 may be followed by operation 214. Operation 214 (record matches and related data) illustrates the server 140 recording the matches derived from the comparison of the received digital signals and the reference digital signals. The matches can be stored in a database associated with the server 140. The matches comprise information about the media associated with the matched digital fingerprints. For example, for each match between a received digital signature and a reference digital signature, the server 140 retrieves information about the reference media associated with the reference digital signature and associates the retrieved information with the media detected at the personal electronic device 100 and associated with the received digital signature. Operation 214 further illustrates the server 140 recording data related to the matches. The related data can be stored in the same database where the matches are stored or in a different database and comprises information derived from the matches and from the additional information received from the personal electronic device 100. For example, the related data comprises user usage information and additional services. Operation 214 may be followed by operation 216.

Operation 216 (transmit matches to personal electronic device) illustrates the server 140 transmitting the matches to the personal electronic device 100. For example, the server 140 can also transmit the related data to the personal electronic device 100. The transmission can be in real-time, at intervals, or upon request and can be associated with a transmission rate adjustable based on parameters associated with the server 140, the network 120, and the personal electronic device 100. In an embodiment, operations 212-216 can be partially or completely executed at the personal electronic device 100 instead of the server 140. For example, following operation 210, the server 140 can send a set of reference digital signatures to the personal electronic device 100 based on the received fingerprints and the additional information. Alternatively, the personal electronic device 100 may cache reference digital signatures based on previous transactions with the server 140. The personal electronic device 100 executes operations 212-214 and transmits information back to the server 140 indicative of the matches.

In an embodiment, a media that has an audio component or content, such as a song, a music track, a television show, a movie, and the like may be associated with a plurality of fingerprints. Once a match of the media is detected at the server 140, the server 140 may transmit reference fingerprints associated with that media to the personal electronic device 100. In turn, the personal electronic device 100 stops transmission of generated fingerprints to the server 140. Instead, the personal electronic device compares and matches the generated fingerprints to the reference fingerprints received from the server 140. This comparison and matching continues on the personal electronic device 100 based on various parameters. Thereafter, the personal electronic device 100 restarts transmission of generated fingerprints to the server 140 for comparison and matching thereat. The parameters can be, for example, time-based (e.g., for a predefined or adjustable period of time), performance-based (e.g., as long as a number of matches are found at the personal electronic device 100 based on the received reference fingerprints, no generated fingerprints are transmitted to the server 140), or associated with the number of the received reference fingerprints (e.g., the personal electronic device 100 restarts transmission of generated fingerprints once the comparison and matching spanned the complete set of received reference fingerprints). These parameters can be adjusted based on, for example, an estimated distortion level of the media as received at the personal electronic device 100. In an example, the server 140 can also transmit an estimated time length associated with the matched media. The personal electronic device 100 stops transmission of generated fingerprints, or generation and transmission of fingerprints, to the server 140 until that time length elapses. These various techniques can be implemented to save resources at the personal electronic device 100, the server 140, and the network, such as power and bandwidth.

Operation 216 may be followed by operation 218. Operation 218 (receive matches) illustrates the personal electronic device receiving the matches from the server 140. Operation 218 can also include the personal electronic device 100 receiving the related data from the server 140. The personal electronic device 100 displays the matches to a user thereof based on predefined settings associated with the personal electronic device 100. Operation 216 may be also followed by operation 220. Operation 220 (transmit related data to third party) illustrates the server 140 transmitting the related data to the third party 160. The related data can be customized based on parameters received from the third party 160, based on privacy settings associated with the user, and based on regulatory requirements. Operation 220 may be followed by operation 222.

Operation 222 (receive related data) illustrates the third party 160 receiving the related data from the server 140. The reception can be in response for a request sent from the third party 160 to the server 140. Alternatively, the reception can be automatic based on predefined settings. Operation 222 may be followed by operation 224. Operation 224 (customize services to the personal electronic device) illustrates the third party 160 customizing services, such as advertisements or discount offers, to the personal electronic device 100 based on the received related data. Operation 224 may be followed by operation 226. Operation 226 (transmit services to personal electronic device) illustrates the third party 160 transmitting the customized services to the personal electronic device 100. The transmission can be based on predefined privacy settings set at the personal electronic device 100 and based on regulatory privacy requirements. Further, the services can be transmitted directly to the personal electronic device 100 or indirectly by channeling the services through the server 140 that may apply some filters thereto prior to transmitting the filtered services to the personal electronic device 100. Operation 226 may be followed by operation 228. Operation 228 (receive services) illustrates the personal electronic device 100 receiving the services directly or indirectly from the third party 160. The personal electronic device 100 can, for example, display the services to the user. One skilled in the art will appreciate that, for this and other operational procedures and methods disclosed herein, the operations and methods may be implemented in a different order or on other computing devices, or shared between the personal electronic device 100, the server 140, and the third party 160. Furthermore, the outlined operations are only provided as examples, and some operations may be optional, combined into fewer operations, or expanded into additional operations.

Figure 3:
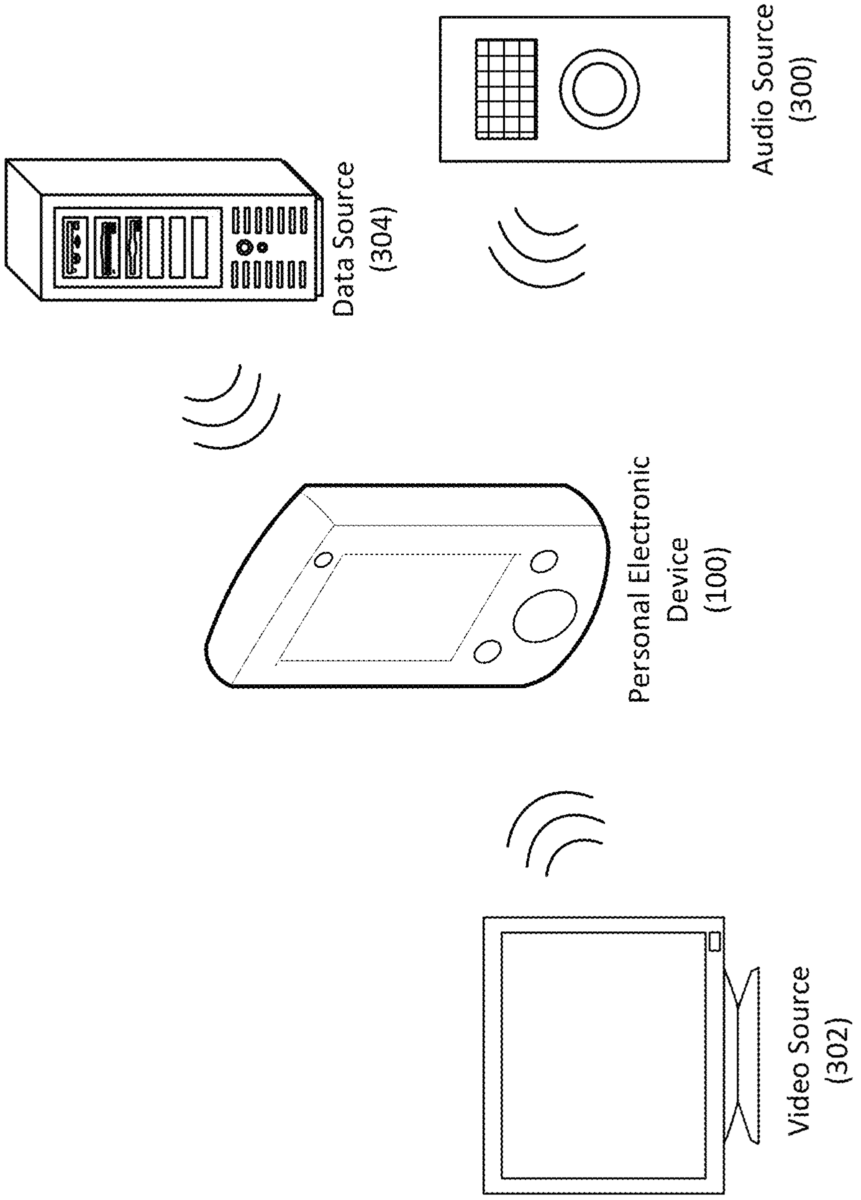

FIG. 3 depicts an example of data sources and data types that an electronic device can be exposed to. As shown, the personal electronic device 100 can be exposed to audio source 300, video source 302, and data source 304. The audio source 300 comprises any device that broadcasts or transmits audio. For example, the audio source 300 can be a radio. Similarly, the video source 302 can comprise any device that broadcasts or transmits video and audio, where the audio can be associated with the video. For example, the video source 302 can be a television. The data source 304 comprises any source that broadcasts or transmits data that has an audio or sound component. For example, the data source 304 can be an electric guitar, a person engaged in a conversation, or street noise. The personal electronic device 100 comprises a component for receiving the data. For example, the personal electronic device 100 can comprise a microphone to detect the audio and circuitry associated therewith to translate the detected audio into data signals. Further, the personal electronic device 100 can receive the data wirelessly as shown in FIG. 3 or using a wired connection (not shown). For example, the personal electronic device 100 and the video source 302 can be connected using a RCA cable over which the personal electronic device 100 receives data from the video source 302.

Figure 8:
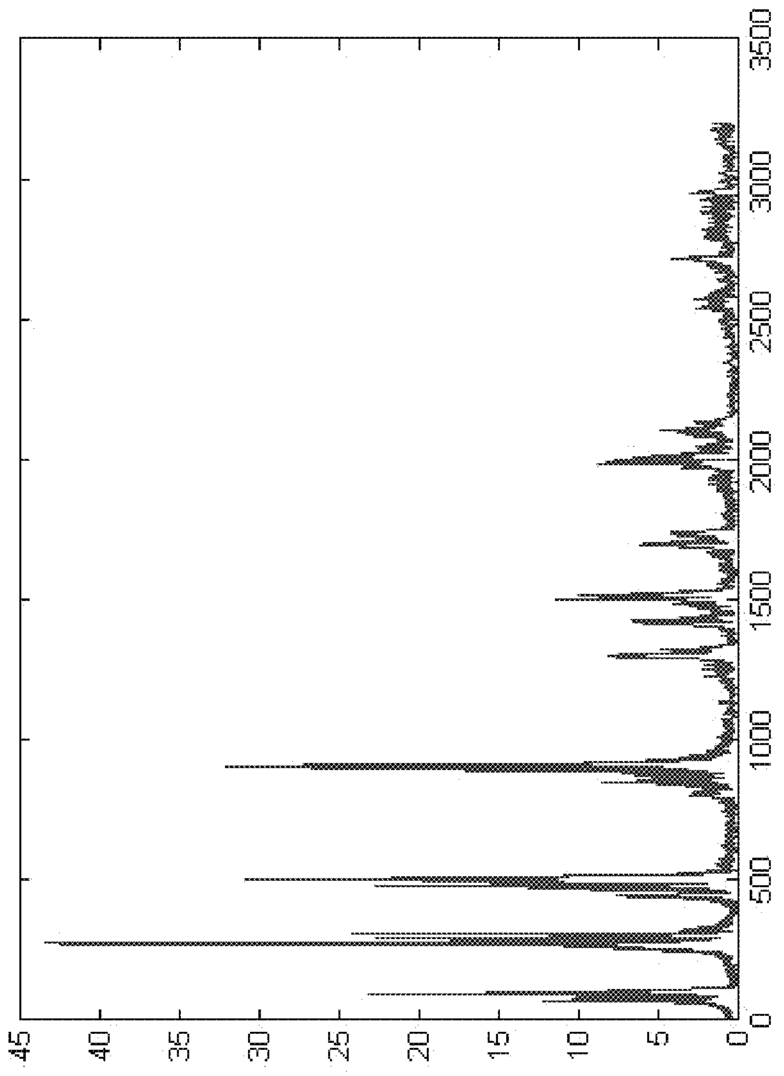
FIGS. 8-11 depict example processing of data samples.

Although the data described in the various embodiments comprises an audio or a sound component, the embodiments are not limited as such. Additionally or alternatively, the data can comprise any other data that have a similar representation to what is shown in FIG. 8. Further, although the data described in the various embodiments comprises data received at the personal electronic device 100 from a source, such as audio source 300, video source 302, or data source 304, the embodiments are not limited as such. Additionally or alternatively, the data can comprise data stored on the personal electronic device 100.

Figure 4:
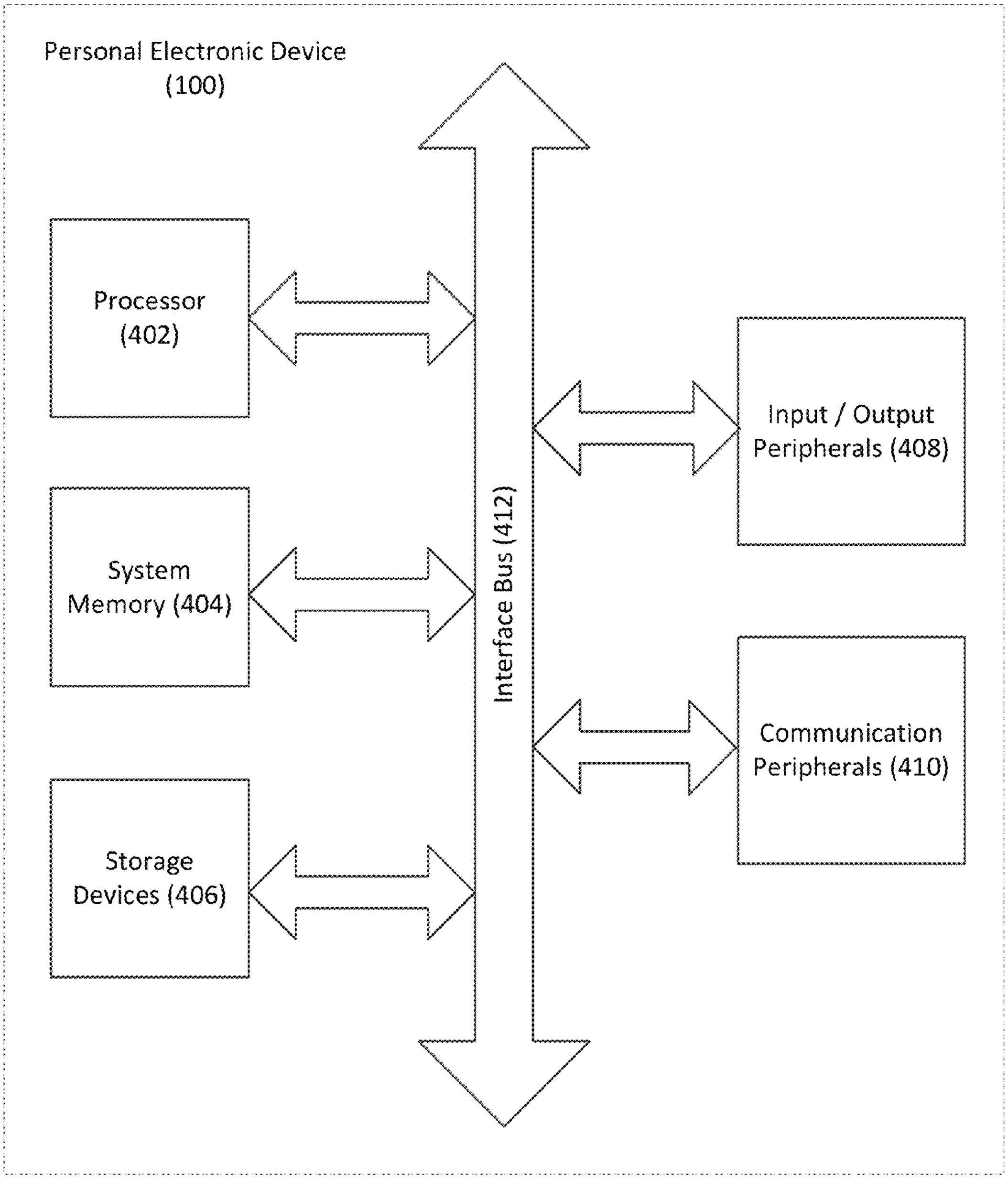
FIG. 4 depicts an example computing system for generating digital signatures.

FIG. 4 depicts an example computing system for generating digital signatures. In a basic configuration, the computing system comprises the personal electronic device 100. The personal electronic device 100 may include at least a processor 402, a system memory 404, a storage device 406, input/output peripherals 408, communication peripherals 410, and an interface bus 412. The interface bus 412 is configured to communicate, transmit, and transfer data, controls, and commands between the various components of the personal electronic device 100. The system memory 404 and the storage device 406 comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory 404 comprises an operation system and applications. The processor 402 is configured to execute the stored instructions and can comprise, for example, a logical processing unit, a microprocessor, a digital signal processor, and the like.

Further, the input and output peripherals 408 include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may be connected to the processor 402 through any of the ports coupled to the interface bus 412. Finally, the communication peripherals 410 are configured to facilitate communication between the personal electronic device 100 and other computing devices over a communications network. The communication peripherals 410 include, for example, a network interface controller, modem, various modulators/demodulators and encoders/decoders, wireless and wired interface cards, antenna, and the like.

Figure 5:
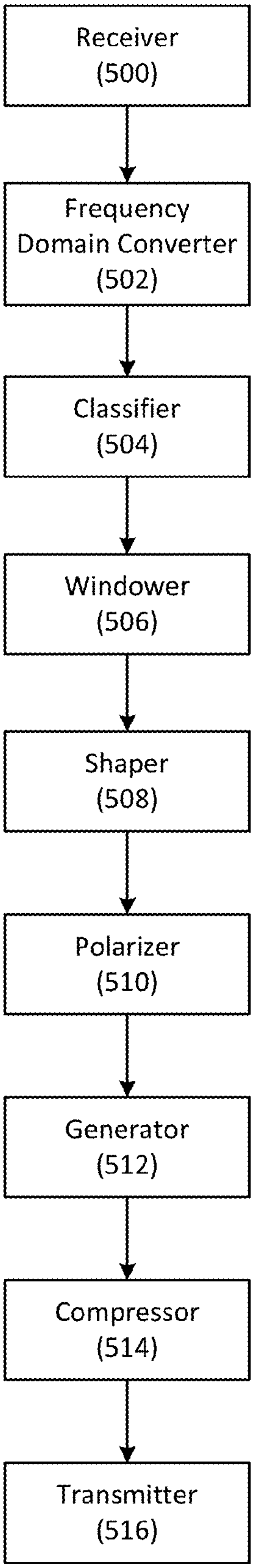
FIG. 5 depicts a further example computing system for generating digital signatures.
Figure 6:
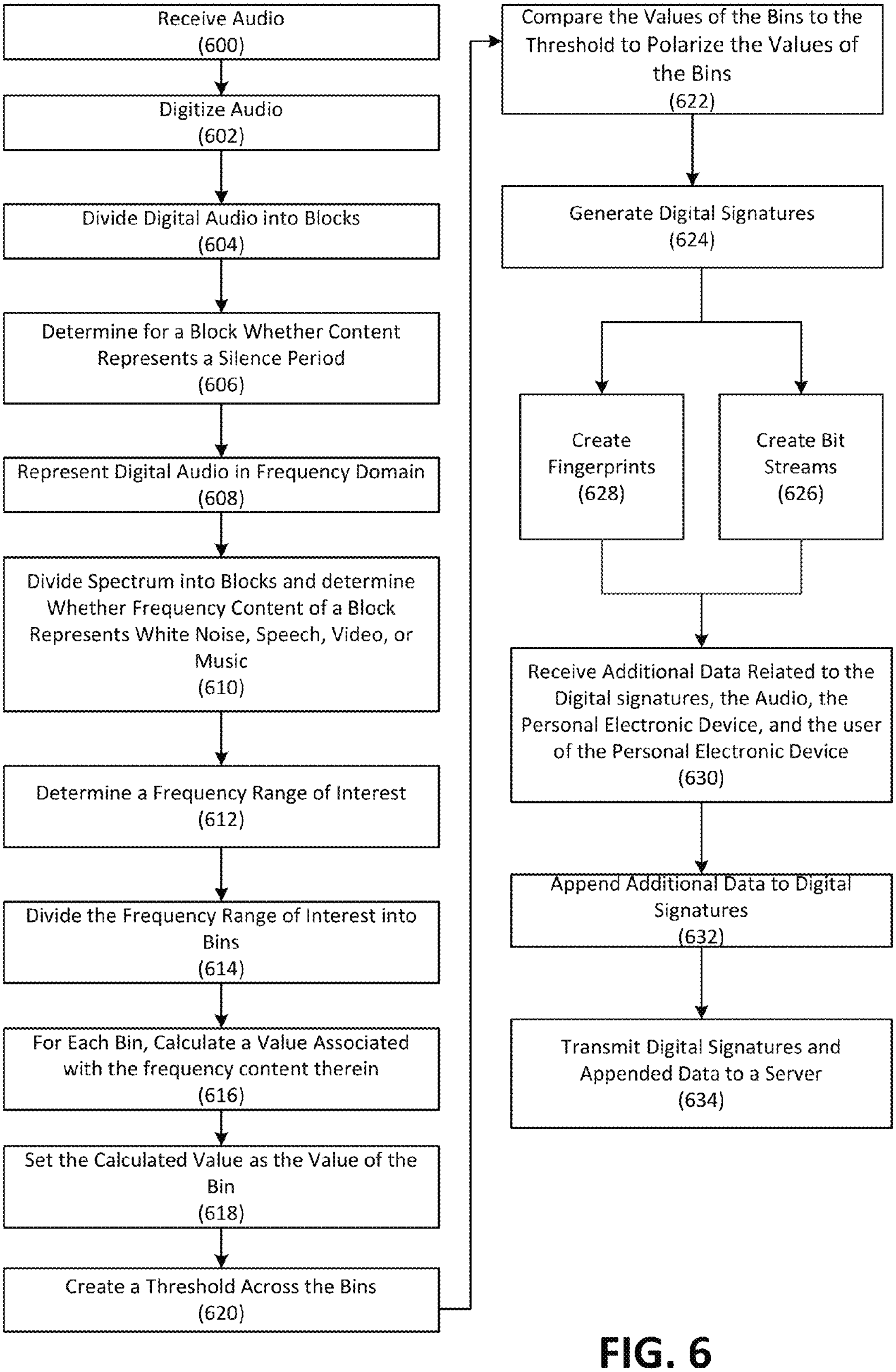
FIG. 6 depicts an example function flow for generating digital signatures.

FIG. 5 depicts a further example computing system for generating digital signatures. The computing system comprises a receiver 500, a frequency domain converter 502, a classifier 504, a windower 506, a shaper 508, a polarizer 510, a generator 512, a compressor 514, and a transmitter 516. In an embodiment, the components 500-516 can be implemented as hardware modules, software modules, or a combination thereof within the personal electronic device 100. For example, the computer readable of the personal electronic device 100 can comprise instructions that, when executed by the processor 402, cause the personal electronic device 100 to provide the functionalities of the components 500-516.

Figure 7:
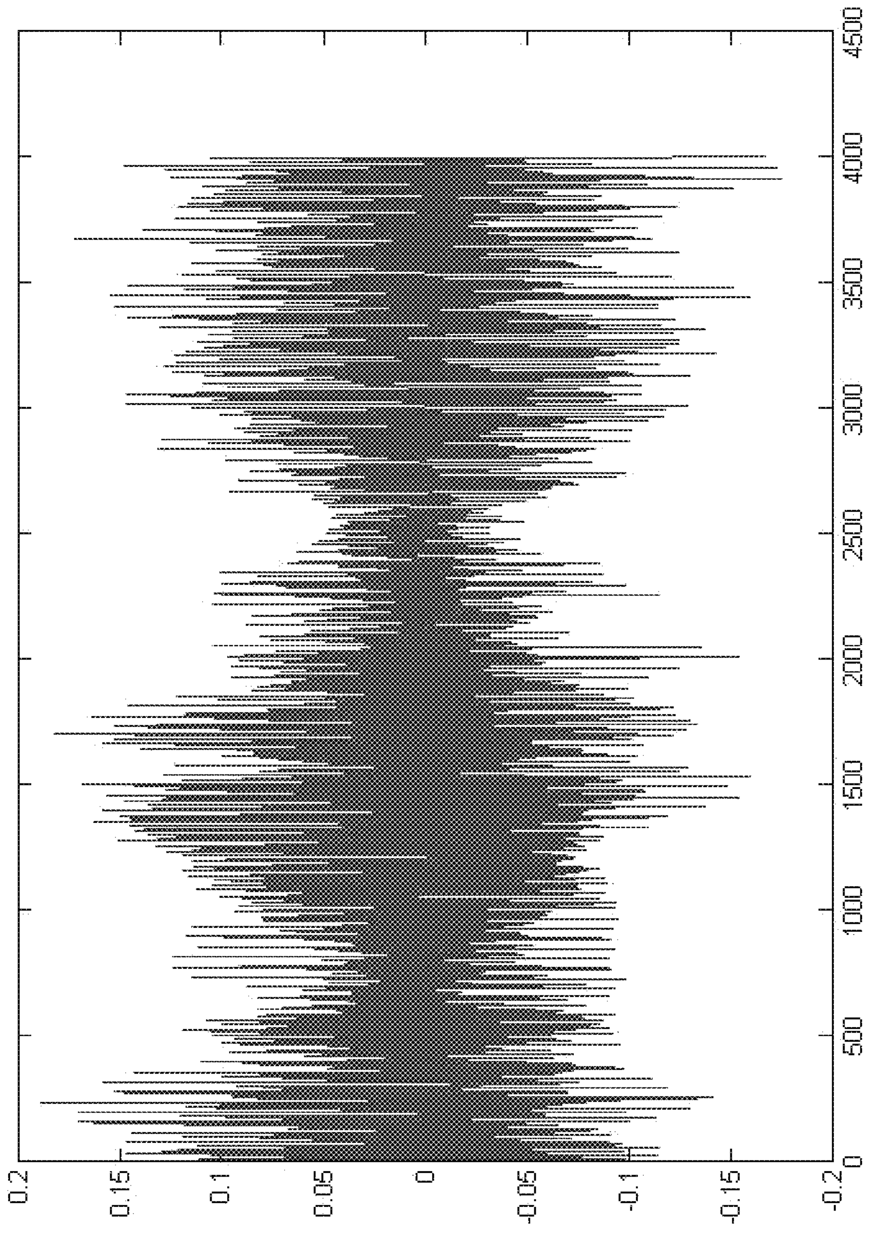
FIG. 7 depicts an example representation of data samples received at a computing system.

Functionalities of the components 500-516 will be described herein below in light of FIGS. 6-15. The receiver 500 is configured to capture data that the personal electronic device 100 is exposed to. For example, the receiver 500 receives audio 600 transmitted from a source, such as the audio source 300. The receiver 500 further digitizes the audio 602 by, for example, sampling the received audio at an appropriate sampling rate. The sampling rate can be predefined or can be dynamically adjusted. In an embodiment, an 8,000 Hz sampling rate is used with a 16 bit resolution per sample. An example of such digital audio is shown in FIG. 7.

In a further embodiment, the receiver 500 can divide the digital audio into blocks 604. The number of blocks and the duration of each block can be set depending on, for example, the sampling rate and the duration of the digital audio. For instance, the receiver 500 can divide the digital audio into a plurality of blocks, each containing a set of the digital samples. The receiver 500 can determine for a block whether content thereof, or the digital samples comprised therein, represents a silence period 606. The silence period can be associated with data that is received at the personal electronic device 100 and that comprises no audio or sound components or that comprises audio and sound components below a noise floor. The receiver 500 can, for example, compare amplitudes of the digital samples within the block to the noise floor to determine a percentage of the digital samples that fall below the noise floor. The percentage can be compared to a predefined threshold set depending on, for example, audio channel characteristics. When the percentage is greater than the predefined threshold, the receiver 500 determines that the content of the block represents a silence period. In another embodiment, the receiver 500 can sum the amplitudes within the block to determine an average thereof and can compare the average to an amplitude threshold. When the average falls below the amplitude threshold, the receiver 500 determines that that the content of the block represents a silence period.

In yet an additional embodiment, when the receiver 500 determines that content of a block represents a silence period, the receiver 500 can instruct the remaining components 502-516 to generate and transmit a set of predefined digital signatures. Such digital signatures can comprise, for example, a stream of all "0" or all "1" bits. The receiver can further instruct the components 502-516 to terminate the processing of the digital audio corresponding to the silence period and to output the set of the predefined digital signatures instead.

The digital audio is sent from the receiver 500 to the frequency domain converter 502. The frequency domain converter 502 is configured to apply a fast Fourier transform (FFT), a discrete Fourier transform (DFT), or any other method that indicates the energy in the spectrum to represent the digital audio in the frequency domain 608. In an embodiment, the frequency domain converter 502 applies a N point FFT for each Y samples of digital audio. N and Y can be set depending on various parameters, such as the sampling rate and frequency range of interest. In an embodiment, a 4,000 point FFT can be applied to every 8,000 samples of digital audio, equating to two seconds of audio.

The audio samples represented in the frequency domain can be sent from the frequency domain converter 502 to the classifier 504. The classifier 504 is configured to divide the spectrum into blocks and to determine whether frequency content of a block represents white noise, speech, video, or music 610. The number of blocks and the frequency range of each block can be set depending on, for example, N and Y. For instance, the classifier 504 can divide the spectrum in one block that contains all the frequency content when Y represents two seconds of audio. Alternatively, the classifier 504 can divide the spectrum into a plurality of blocks, each containing a set of the frequency content when, for example, N is relatively high. For each of the block, the classifier 504 determines whether the corresponding spectral energy corresponds to white noise, speech, video, or music. For example, the classifier 504 can calculate an average of the energy within the block and can compare the average to an energy threshold associated with white noise. When the average is smaller than the energy threshold, the classifier 504 determines that the frequency content of the block represents white noise. Likewise, the classifier 504 can determine a rate at which the energy of the frequency points approaches the energy threshold. When the rate is over a rate threshold associated with speech, the classifier 504 determines that the frequency content of the block represents speech. Additionally, the classifier 504 can compute a covariance associated with the energy of the frequency points and can compare the covariance to a covariance threshold associated with music. When the covariance falls below the covariance threshold, the classifier 504 determines that the frequency content of the block represents video. Otherwise, the frequency content of the block represents music.

The various thresholds, white noise, rate, and covariance can be predefined based on reference data or can be dynamically adjusted based on audio data previously processed through the classifier 504. Furthermore, the classifier 504 can follow a process of elimination to determine whether the spectral energy in the block corresponds to white noise, speech, video, or music. For example, the classifier 504 can determine first if the spectral energy represents white noise. If the classifier 504 determines that the spectral energy represents white noise, the classifier 504 then classifies the block as white noise. Otherwise, the classifier 504 determines if the spectral energy represents speech. If the classifier 504 determines that the spectral energy represents speech, the classifier 504 then classifies the block as speech. Otherwise, the classifier 504 determines if the spectral energy represents video. If classifier 504 determines that the spectral energy represents video, the classifier 504 then classifies the block as video. Otherwise, the classifier 504 classifies the block as music. In an embodiment, the classification of the block can be associated with the digital signatures generated from audio samples that are represented in the block.

The audio samples represented in the frequency domain can be sent from the frequency domain converter 502 or from the classifier 504 to the windower 506. The frequency domain representation comprises frequency points that span over a frequency domain. The windower 506 is configured to determine a frequency range of interest 612 within the frequency domain and to instruct the components 508-16 to process content within the range of interest. The range is selected such that, when its content is processed, the processing dependency on content of other frequency ranges is reduced. This dependency reduction can increase, in turn, the randomness of the corresponding digital signatures. In an embodiment, the windower 506 can set the frequency range of interest such that a certain number of frequency points within the start and within the end of the frequency domain are discarded. For example and referring to FIG. 8, the windower 506 can set the frequency range of interest between 301 Hz and 3,500 Hz and can instruct the components 508-516 to discard spectrum content outside such range (i.e., frequency points between 0 and 300 Hz and between 3,501 and 4,000 Hz). In another embodiment, the selection of the frequency range of interest depends on various parameters including any of the sampling rate, N, Y, the classification of the audio, and a targeted digital signature size. For example, the frequency range of interest can be increased when the sampling rate is decreased.

In a further embodiment, the windower 506 can use similar techniques as described herein above to determine a plurality of frequency ranges of interest within the frequency range. Such ranges may overlap, may span the entire frequency domain, or may be separated by frequency points. For example and referring to FIG. 8, the windower 506 can set the frequency ranges of interest as ranges between 500 Hz and 900 Hz, 1,100 Hz and 1,500 Hz, 1,700 Hz and 2,100 Hz, 2,300 Hz and 2,700 Hz, and 3,100 Hz and 3,500 Hz.

The frequency points within each frequency range of interest can be transmitted to the shaper 508. In an embodiment, the spectrum content can be received from the frequency domain converter 502 or the classifier 504 and the selection of the frequency range of interests can be received from the windower 506. In an alternative embodiment, the spectrum content and the frequency range of interests can be directly received from the windower 506.

The shaper 508 is configured to divide each frequency range of interest into bins 614. The spectrum content of each bin can be processed to generate a bit associated with the digital signature as will be described herein below. The number of bins is set such that the randomness of the generated digital signatures is increased. Further, the number of bins can depend on any of the sampling rate, the frequency range, N, Y, and a targeted digital signature length. In an embodiment, when the frequency range of interest is 3,200 Hz and the targeted digital signature length is 160 bits, the number of bins can be set to 160 such that each bin represents 20 Hz of spectrum content.

For each bin, the shaper 508 can further calculate a value associated with the frequency content therein 616. In other words, the shaper 508 computes the energy in each bin. For example, the shaper 508 can sum absolute values or real components of the frequency points within each bin. The shaper 508 can also set the calculated value as the value of the bin 618.

Figure 9:
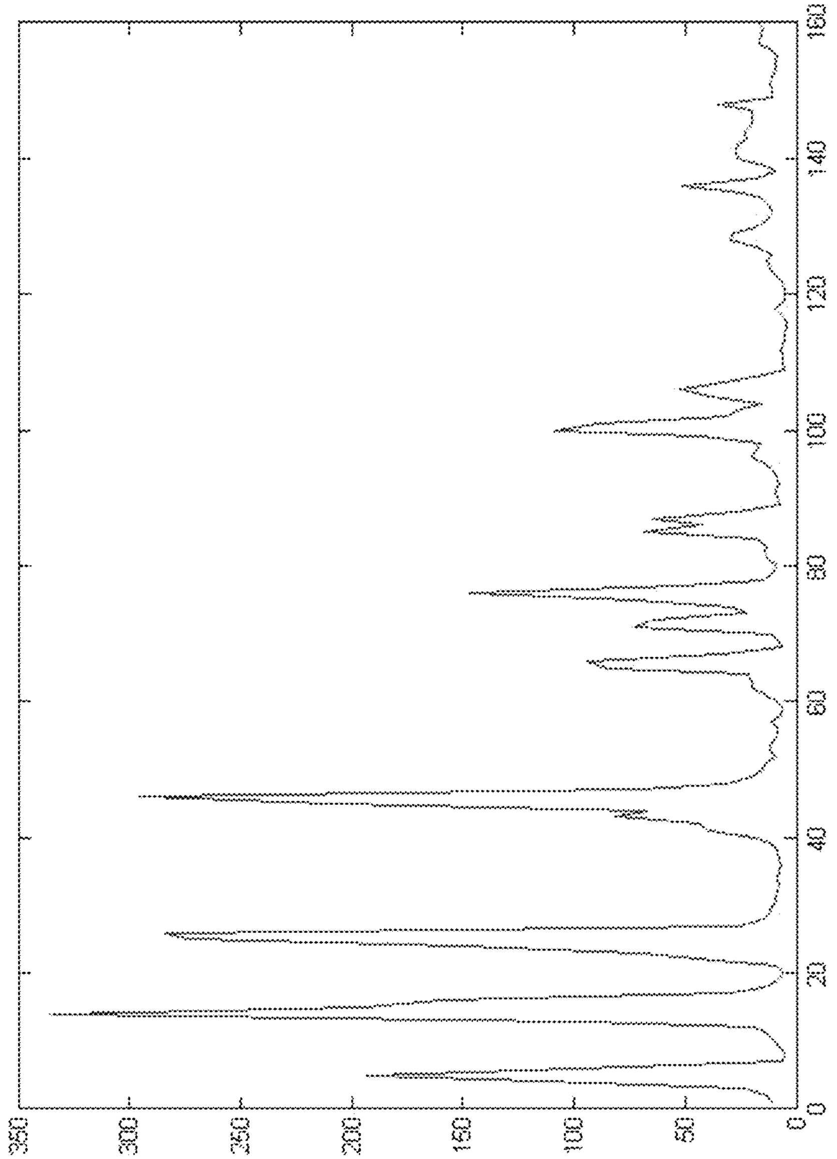

FIG. 9 shows an example of calculating and setting the value of each bin based on the frequency spectrum shown in FIG. 8. A frequency range of interest between 301 Hz and 3,500 Hz is selected from the spectrum shown in FIG. 8 and is divided into 160 bins, each bin representing 20 Hz of frequency content. The absolute values of the frequency points within each bin are summed and the sum is set as the value of the bin. This summation and associated can be plotted as shown in FIG. 9, where the horizontal axis represents the number of bins and the vertical axis represents the value thereof.

The values of the bins can be transmitted from the shaper 508 to the polarizer 510. The polarizer 510 is configured to create a threshold across the bins 620. In an embodiment, the threshold can be constant. For example, the polarizer 510 can compute the average of the values and can set the average as the threshold. In another embodiment, the threshold can be moving. For example, the polarizer 510 can compute the average of a number of values, multiply the average by a factor, and set the result as the threshold across the bins corresponding to the averaged values. The multiplication factor can be used to increase the robustness and noise immunity of the system and can be chosen from a range between 0.5 and 1. For example, a decrease in the multiplication factor decreases the threshold, which in turn increases the number of bins that are larger than the threshold. This increase in the number of bins also increases the number of synchronization events which translates into an improved system robustness and immunity.

In yet another example, the polarizer 510 can recursively compute the threshold of each bin. The polarizer 510 can, for instance, apply an S-point recursive filter where the threshold value of each bin depends on the value of the bin multiplied by a factor and on (S−1) thresholds of preceding bins, each previous threshold being also multiplied by a factor. The computation of the threshold of the first bin can use a default threshold instead of the threshold of the preceding bin. As such and for a 2-point recursive filter, the polarizer 510 can multiply the value of the bin by a first factor to derive a first value, can multiply the threshold of the preceding bin by a second factor to derive a second value, can sum the first and second values, and can set the sum as the threshold of the bin. The first and second values can be selected from a range between 0 and 1. In a further embodiment, the second value is equal to unity minus the first value. For instance, the first value can be set to 0.8 and the second value to 0.2. The first and second values can be adjusted to increase the robustness and noise immunity of the system. For example, when the first factor is increased and the second factor is decreased, the recursivity of the threshold is decreased. In other words, the threshold's dependency on the value of the bin is increased and the threshold's dependency on the preceding bin's threshold is decreased. Similarly, when the first factor is decreased and the second factor is increased, the recursivity of the threshold is increased. Thus, depending on the trustworthiness of the current bin value and the previous thresholds, the first and second factors can be adjusted to increase the dependency of the current threshold on the value of the bin or the previous thresholds. The trustworthiness can depend, for example, on the values of the bins and the thresholds or the location of the current bin within the frequency range. Setting up the first factor in the range of 0.75 to 0.85 and the second factor as unity minus the first factor maximizes the robustness and noise immunity of the system.

Figure 10:
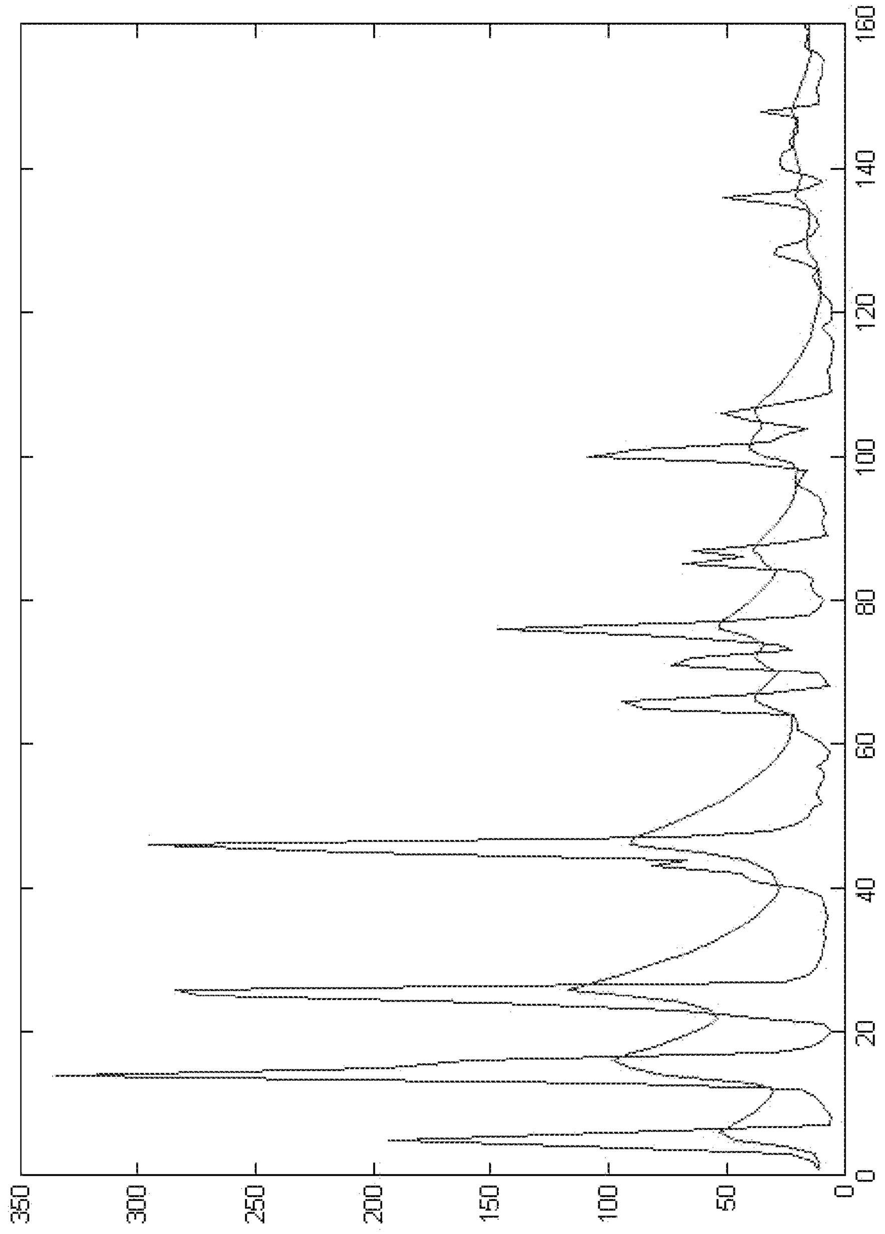
Figure 11:
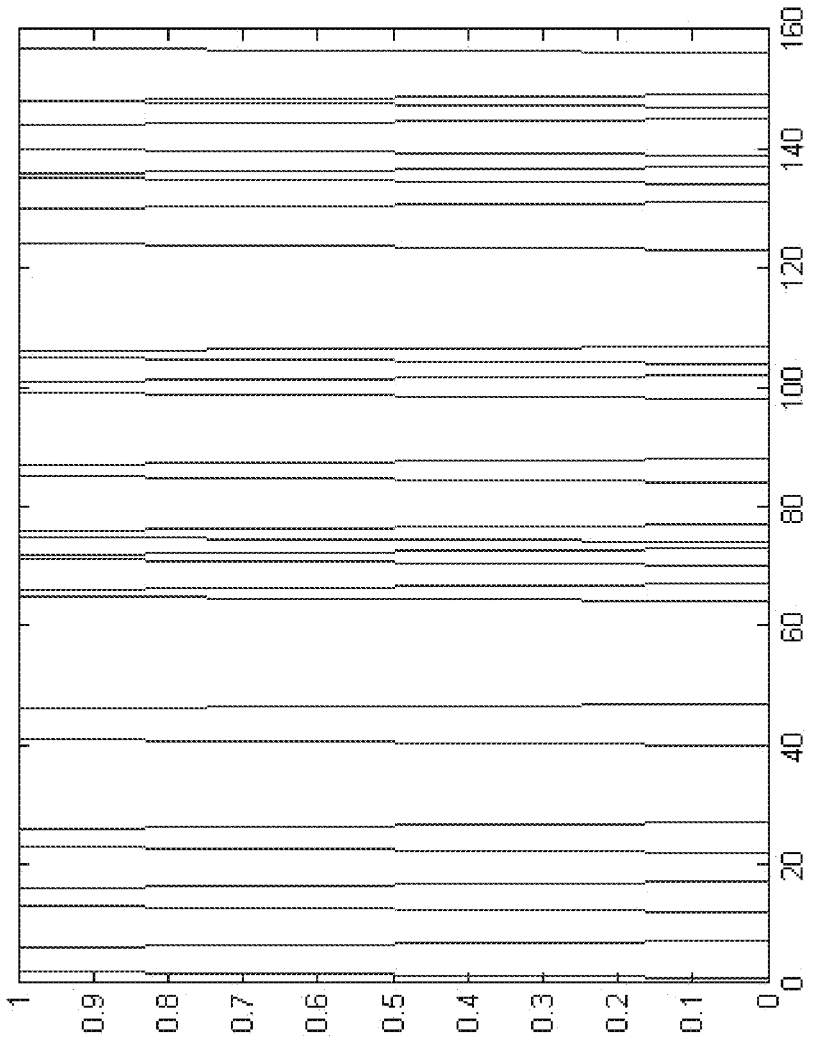

FIG. 10 depicts a moving threshold generated by a 2-point recursive filter that uses a first factor of 0.8 and a second factor of 0.2. The moving threshold is plotted over the values of the bins derived in FIG. 9. The polarizer 510 can compare the values of the bins to the threshold to polarize the values of the bins 622. For example, for each bin, the polarizer 510 compares the value to threshold at that bin point. When the polarizer 510 determines that the value is greater than the threshold, the polarizer 510 associates a first bit value with the bin. Otherwise, the polarizer 510 associates a second bit value with the bin. The polarizer 510 repeats this comparison and polarization process for each bin such that each bin becomes associated with either the first or the second bit value. As an example, the first bit value can be "1" and the second bit value can be "0." The result of applying this comparison and polarization process to the bins of FIG. 10 is shown in FIG. 11.

The output from the polarizer 510 can be transmitted to the generator 512. The generator 512 is configured to generate digital signatures 624 based on the polarized data. For example, the bit value of each bin can be set as a value of a bit of the digital signature. The allocation of bin bit value to digital signature bit value can be sequential or can follow a random or predefined order. In a sequential order, the value of the first bit in the digital signature is mapped to the bit value of the first bin, the value of the second bit in the digital signature is mapped to the bit value of the second bin, and so on such as the $N^{th}$ bit in the digital signature is mapped to the bit value of the $N^{th}$ bin. For example and referring to FIG. 11, for 160 bin bit values, a digital signature of 160 bits is generated, where a $K^{th}$ bit of the digital signature has the value of the $K^{th}$ bin and where K belongs to the range of 1 to 160. In a predefined order, the mapping of the bits in the digital signature to the bin bit values can be in a sequential order that omits every other bin bit value. For example, the value of the first bit in the digital signature is mapped to the bit value of the first bin, the value of the second bit in the digital signature is mapped to the bit value of the third bin, and so on such as the $N^{th}$ bit in the digital signature is mapped to the bit value of the (2×N−1) bin. For example and referring to FIG. 11, for 160 bin bit values, a digital signature of 80 bits is generated, where a $K^{th}$ bit of the digital signature has the value of the (2×K−1) bin and where K belongs to the range of 1 to 80.

Figure 12:
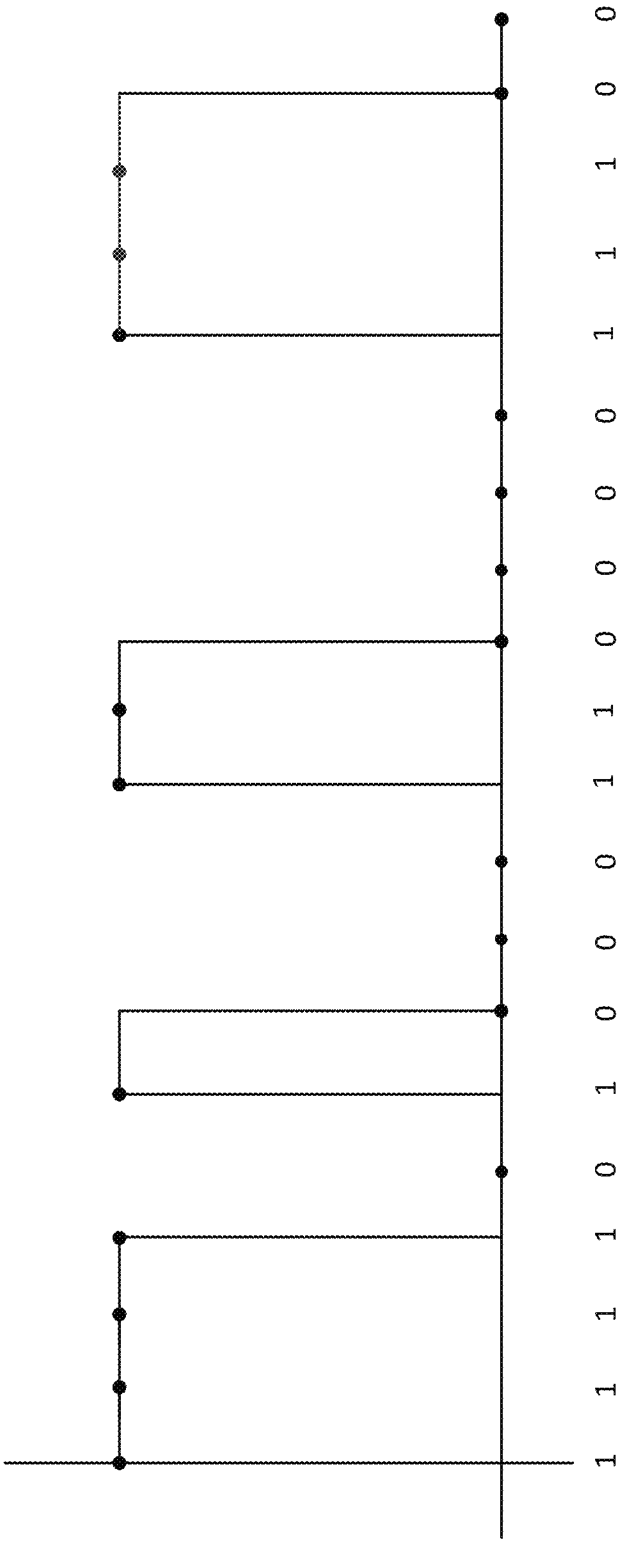
FIG. 12 depicts an example bit stream.

An example of generating a digital signature is shown in FIG. 12. As depicted, the generator 512 generates the digital signature in a sequential order where a bin bit value of "1" is allocated to a "1" bit in the digital signature and where a bin value of "0" is allocated to a "0" bit in the digital signature. The output of the generator 512 is a digital signature comprising "0" and "1" bits, each bit representing a bin bit value, each bin bit value representing whether the bin value is greater or smaller than a threshold, each bin value representing spectral content of a bin, each bin comprising spectral content within a frequency range, the spectral content being derived from frequency domain representation of audio samples within a frequency range of interest. As such, when an 8,000 Hz sampling rate is used to sample two seconds of audio, a 4,000 point FFT is applied, a frequency range of interest between 301 and 3,200 Hz is selected, and bins of 20 Hz are processed, the result is a 160 bit digital signature that represents the two seconds of audio.

The digital signature can be transmitted to the compressor 514 for further processing. The compressor 514 is configured to create bit streams 626 and/or fingerprints 628 thereof. For example, the compressor 514 can concatenate digital signatures corresponding to various sections or time periods of the audio received at the personal electronic device 100. The concatenation can be in a temporal and sequential order. The concatenation results in a bit stream that corresponds to a time period of the audio. Similarly, the compressor 514 can create fingerprints from the digital signatures or from the bit streams. For example, the compressor 514 can select every other bit from a digital signature as a bit of the fingerprint. Thus, when a 160 bit signature is used, an 80 bit fingerprint is generated. This selection can be sequential, random, or following a predefined pattern. Additionally, the bits can be re-ordered during or after the selection.

Figure 13:
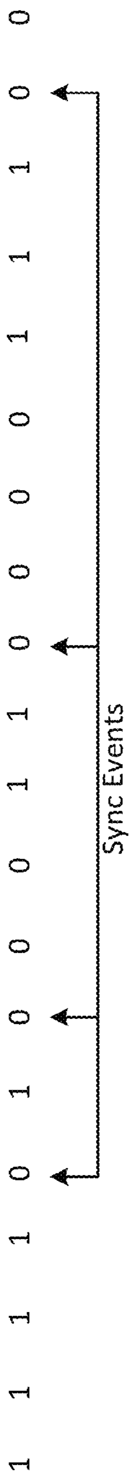
FIG. 13 depicts example synchronization events within a bit stream.

In an embodiment, a fingerprint is generated from a digital signature or a bit stream based on at least a synchronization event. A synchronization event can represent a predefined bit pattern within the digital signature or the bit stream. For example, the synchronization event can be associated with a transition from a "1" bit to a "0" bit as shown in FIG. 13. In another example, the synchronization event can be associated with other transitions, such as from "0" to "1" or from a plurality of "1s" to a plurality of "0s." Further, other patterns can be used. For example, every $N^{th}$ bit can be considered as a synchronization event. In another example, a moving window of bits associated with a digital signature can be used. The window can comprise, for instance, 80 bits. The bits within the window are summed, and the value of the sum can be set as the location of the synchronization event. For example, if the sum is 24, then bit number 24 in the window is set as the synchronization event.

In a further embodiment, when multiple synchronization events within a digital signature or a bit stream are identified, the compressor 514 can select a subset of synchronization events therefrom. For example, the first and last synchronization events can be discarded and the remaining synchronization events can be used. In another example, the selection can be random and can account for a targeted number of synchronization events. For instance, when 20 synchronization events within a 160 bit digital signature are identified and when the targeted number of synchronization events is 8, the compressor 514 can randomly set 8 out of the 20 synchronization events as the events to be used for generating the fingerprints. The synchronization events are selected such that the randomness of the generated fingerprints is increased, which also increases the robustness and noise immunity of the system.

In an embodiment, multiple fingerprints can be generated from a single digital signature. For example, when the digital signature comprises multiple synchronization events, and when various synchronization events are selected, a fingerprint can be generated based on each selected synchronization event. Even when the digital signature comprises one synchronization event or when only one synchronization event is selected, multiple fingerprints can still be generated based on that synchronization event by, for example, using different offsets or digital signature collection patterns.

In an embodiment, the generation of the fingerprints can depend on various parameters, including a preset fingerprint size, the classification of the audio, the length of the audio, the sampling rate of the audio, channel conditions, and feedback from a server that the fingerprints are transmitted to. The various parameters are used such that the randomness of the fingerprints is increased. For example, for long audio sampled at a low rate, the preset size is increased. In comparison, for short audio sampled at a high rate, the preset size is decreased. Similarly, if the channel suffers from high interference or if audio received at the personal electronic device 100 is distorted, the predetermined size of the fingerprint is increased. Likewise, if the audio is classified as speech, the preset size of the fingerprint can be smaller than the size for audio classified as music. The feedback received from the server can also set the size of the fingerprints. For example, the server can require all fingerprints to be 80 bit long, or can require that fingerprints of audio classified as speech to be 40 bits while fingerprints of audio classified as music to be 80 bits.

Figure 14A:
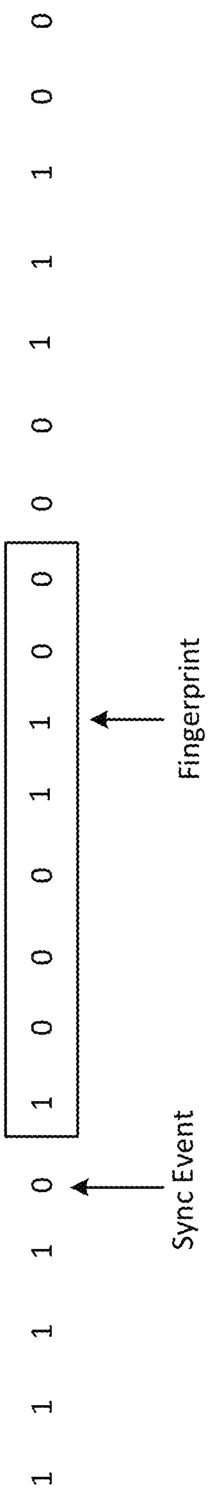
FIGS. 14A-B depict an example fingerprint.
Figure 14B:
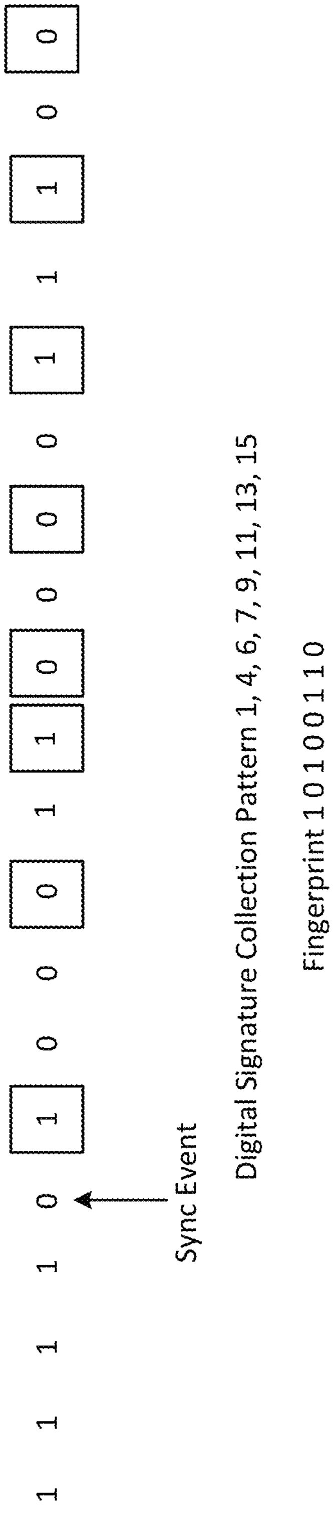
Figure 15:
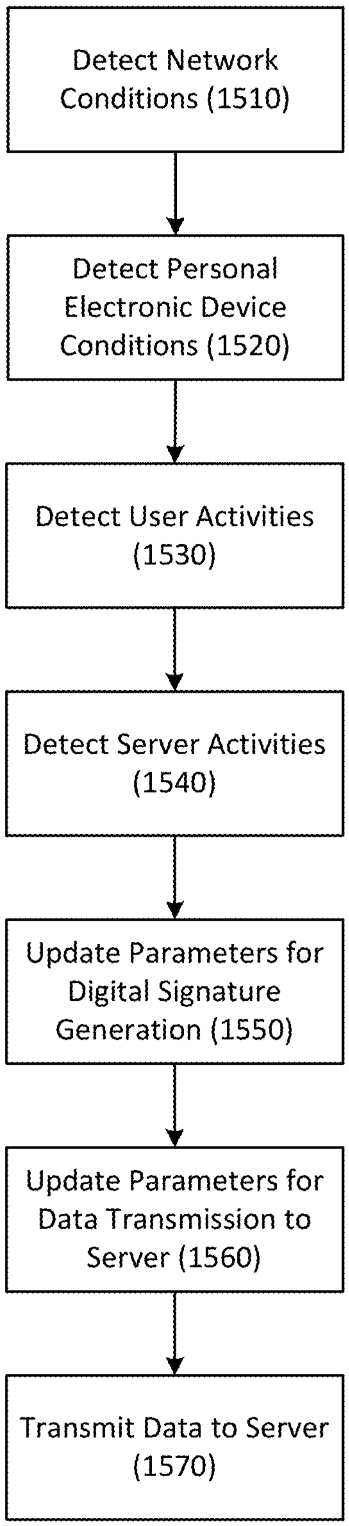
FIG. 15 depicts an example transmission of digital signatures from a first computing system to a second computing system.

Once the preset size of the fingerprints is derived, the compressor 514 can use the selected synchronization events to generate the fingerprints. For example, the compressor 514 can use a positive or negative offset relative to a selected synchronization event to select a number of bits equal to the preset size. FIG. 14A depicts an example of using a positive offset of one to select bits for an eight bit fingerprint. As shown, the first eight bits following the synchronization event are selected and set as the fingerprint. FIG. 14B presents another example of using offsets. As depicted, a digital signature collection pattern can be predefined and used to select the bits relatively to the synchronization event. For example, the digital signature collection pattern can require the first, fourth, sixth, seventh, ninth, eleventh, thirteenth, and fifteenth bits following the synchronization event to be selected.

In a further embodiment, the compressor 514 can further process a fingerprint to ensure the randomness of the fingerprint. For example, the compressor 514 can sum the bits of the fingerprint. The sum represents the number of occurrences of the "1" bit within the fingerprint. When the sum is smaller than a first threshold or greater than a second threshold, there is an indication that the fingerprint is not random enough because the fingerprint comprises a small or large number of "1s." The first and second thresholds can be defined as a percentage of the fingerprint length. For example, the first and second thresholds can be set to twenty and eighty percent, respectively. As such, when an 80 bit fingerprint is analyzed, if the sum of the bits is less than 16 or greater than 64, the compressor 514 can discard the fingerprint for not being random enough.

The output from the compressor 514 can be transmitted to the transmitter 516. The transmitter 516 can also receive 630 additional data related to the digital signatures, the audio, the personal electronic device 100, and the user of the personal electronic device 100. The data can be received from the personal electronic device 100. The additional data can comprise, for example, timestamps associated with the time when the digital signatures were created, the audio sampling rate, the classification of the audio, and context information associated with the personal electronic device 100 and the user.

The transmitter 516 can append the additional data to the digital signatures 632 and can transmit the digital signatures and the appended data to a server 634, such as the server 140. In an embodiment, the appended data can be added as overhead data to the digital signatures. Additionally, the appended data need not be transmitted at the same rate as the transmission rate of the digital signatures. For example, the additional data is appended and transmitted only when information contained therein is changed. For instance, when the first or initial digital signature is transmitted, the transmitter 516 may append thereto and transmit therewith a complete set of additional data. As subsequent digital signatures are transmitted, the transmitter 516 may only append and transmit the additional data that changed following the last transmission. For example, if the context information associated with the personal electronic device 100 did not change but the context information associated with the user changed, the transmitter 516 appends only the updated user context information. Likewise, the transmitter 516 may append the first timestamp associated with the first digital signature and, thereafter, stop appending and transmitting the subsequent timestamps unless the transmission is halted or interrupted. In such scenario, the server receiving the digital signatures and the additional data from the transmitter 516 can derive the timestamps for a specific digital signature based on the first timestamp, the sampling rate, and the location of the specific digital signature in the series of received digital signatures.

In an embodiment, the transmitter 516 detects the network conditions 1510, the personal electron device conditions 1520, user activities 1530, and server activities 1540. The network conditions comprise the type of available network (e.g., WiFi, cellular, etc.), network priority, and network bandwidth. The personal electronic device conditions comprise size of data to be transmitted, applications running on the personal electronic device 100, power source of the personal electronic device 100, and power charge level of the personal electronic device 100. The user activities comprise activities associated with the user's utilization of the personal device 100 and activities independent of the personal electronic device 100. For example, the user activities include the user executing a phone call over the personal electronic device 100, playing audio from the personal electronic device 100, etc. Other user activities include, for instance, playing a sport y, sleeping, chatting with another person, etc. The server activities can be provided as feedback from the server to the personal electronic device 100. The feedback includes, for example, parameters for generating the digital signatures, transmission rate of the digital signatures, etc.

The transmitter 516 processes the detected information to update parameters associated with the generation of the digital signatures 1550. For example, when the transmitter 516 detects a low power charge of the personal electronic device 100, the transmitter 516 can instruct the components 500-514 to decrease the rate at which the digital signatures are generated. For example, the receiver 500 can digitize the audio at a lower rate, the windower 506 can increase the frequency range of interest, or the shaper can increase the bin sizes. Similarly, when the transmitter 516 detects that higher bandwidth is available on the network, the transmitter 516 can instruct the components 500-514 to increase the rate at which the digital signatures are generated.

The transmitter 516 processes the detected information to also update parameters associated with the data transmission to the server 1560. For example, when the transmitter 516 detects that network bandwidth is available, the transmitter 516 can transmit in real-time the digital signatures as they are generated. When the transmitter 516 detects that the battery power level of the personal electronic device 100 is low, the transmitter 516 can store the digital signatures and transmit them only after detecting that the battery is reenergized to a predefined power level. Similarly, when the transmitter 516 detects that the user is on a phone call, the transmitter 516 can halt the transmission until the phone call is complete. Likewise, the transmitter 516 can set the transmission rate to a rate received from the server. Once the transmitter 516 updates the transmission parameters, the transmitter 516 transmits the data to the server 1570, the data including the digital signatures and any appended additional data.

In an embodiment, the personal electronic device 100 can continuously monitor the data received thereat. For example, audio over a period of a day or 86,400 seconds can be received at the personal electronic device 100. Every two seconds of audio can be sampled at a sampling rate of 8,000 Hz. Additionally, a 4,000 point FFT, a frequency range of interest between 301 and 3,200 Hz, and a bin size of 40 Hz can be used. The processing of the two seconds of audio results in an 80 bit digital signature. Thus, for a day of audio, 43,200 digital signatures of 80 bits each are generated. This equates 3,465,000 bits or 432 Kbytes of data. To put data size in perspective, the average length of a song in the United States of America is approximately 4 minutes. Thus, for a 24 hour period, 432 Kbytes of data can represent digital signatures of approximately 360 songs.

Various techniques exist that create audio fingerprints from a replayed piece of audio that is recorded via a microphone. In some applications, these audio fingerprints are used to identify the original piece of audio. Similarity between audio fingerprints can be determined by comparing the fingerprints, bit-by-bit, and counting the number of bit locations in which the bits of the two fingerprints are the same. This is sometimes referred to as a hamming distance or hamming weight. However, when the recorded audio experiences higher levels of distortion, it is necessary to allow more and more bits between the two audio fingerprints to be different (a higher bit-error-rate BER) in order to accept a match. By allowing a greater number of bits to be different, various technical barriers are introduced such as reducing entropy and increasing false positives. The present disclosure describes a technique whereby higher BERs are considered while overcoming the technical barriers.

For example, if the field audio experienced no distortion at all, it may be possible to convert an 80 bit fingerprint to a decimal number using unsigned binary to decimal conversion. The task of matching from fingerprints between databases is simplified to a decimal number lookup which is not computationally intensive. If distortion exists but is minimal, it is possible to permute an 80 bit field fingerprint by sequentially flipping each bit, one at a time, and generating several decimal numbers from the fingerprint. In the example of an 80 bit fingerprint, 80 decimal numbers are created that represent each fingerprint. If distortion exists, to a slightly higher level, then it is expected that more than one bit of the 80 bits are potentially different between the compared fingerprints. In this case, it is possible to permute up to two bits at a time and convert the permutations to decimal numbers. However, as distortion approaches higher levels, it may not be practical to keep permuting additional bits to convert to decimal numbers because the number of decimal numbers is increased to a point that renders their processing impractical.

Rather than permuting bits and converting to decimal numbers, techniques for comparing received fingerprints and reference fingerprints provide a computational advantage. The comparison can determine the hamming distance between the fingerprints. If few bits are deemed to be different, a candidate match is identified. But for the system to be highly immune to distortion, it may be insufficient to look at one fingerprint at a time. Therefore, the systems and methods described herein relate to considering several fingerprints at one time, in what is referred to as a window, to determine if sections of audio are matching. Further, a sequence of windows is considered as a whole to determine a match.

Figure 16:
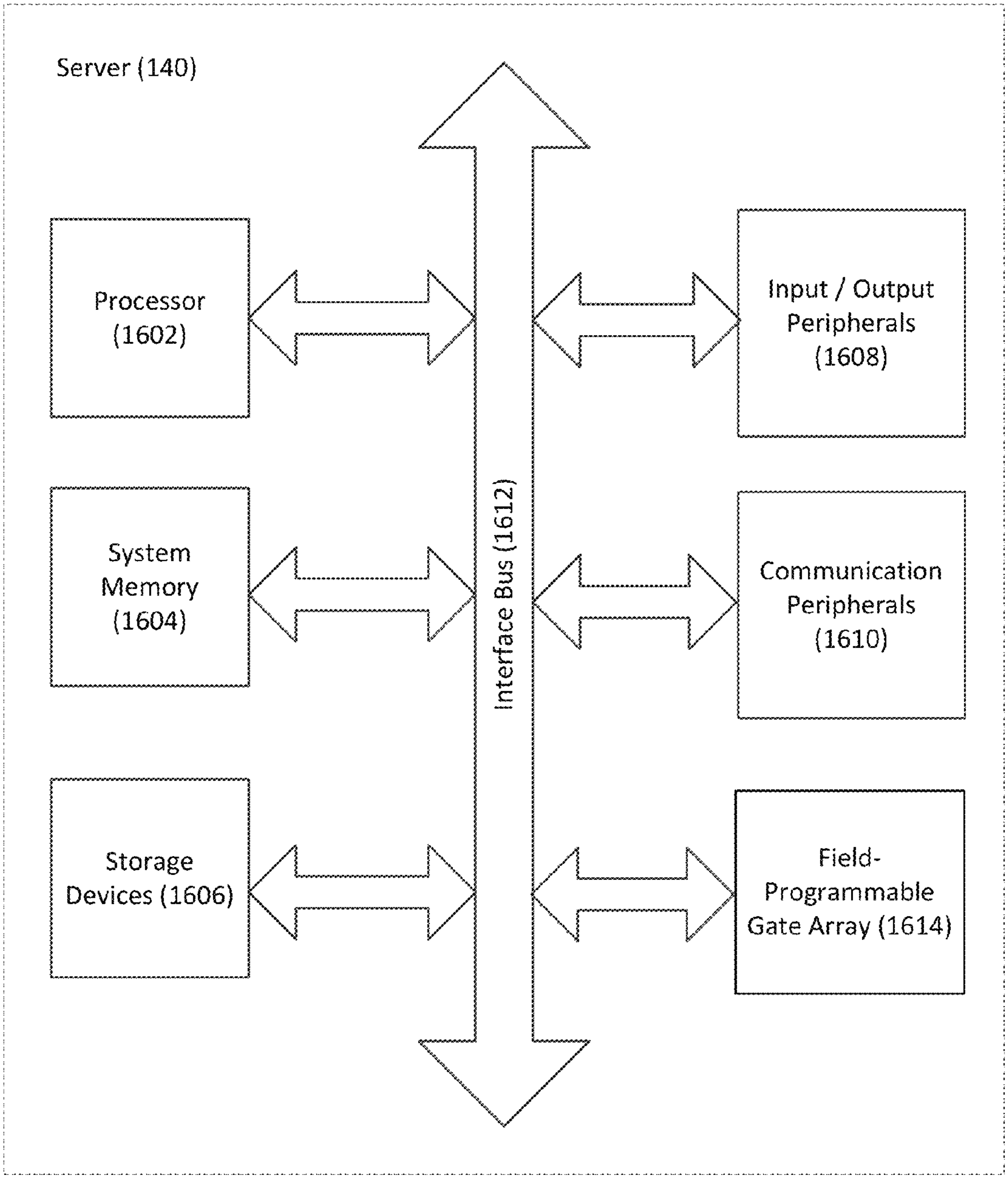
FIG. 16 depicts an example computing system for processing received digital signatures.

FIG. 16 depicts an example computing system for processing received digital signatures to identify the media associated therewith. In a basic configuration, the computing system comprises the server 140. The server 140 can be configured to compare the received digital signatures to reference digital signatures in order to determine matches therebetween. The server 140 may include at least a processor 1602, a system memory 1604, a storage device 1606, input/output peripherals 1608, communication peripherals 1610, and an interface bus 1612. Components 1602-1612 may have similar architectures or functionalities as components 402-412 described in FIG. 4. The server may also include a field-programmable gate array (FPGA) 1614 that interfaces with components 1602-1612 using the interface bus 1612. In an embodiment, the FPGA 1614 comprises some or all elements of components 1602-1612. FPGA 1614 can be configured to implement aspects of the present disclosure including the processing of the received digital signatures. The use of FPGA 1614 increases the processing speed and minimizes the architecture complexity of the server 140. Similarly, the server may include programmable logic devices (PLDs) or application specific integrated circuits (ASICs) components (not shown) that can be configured to implement aspects of the present disclosure including the processing of the received digital signatures.

Figure 17:
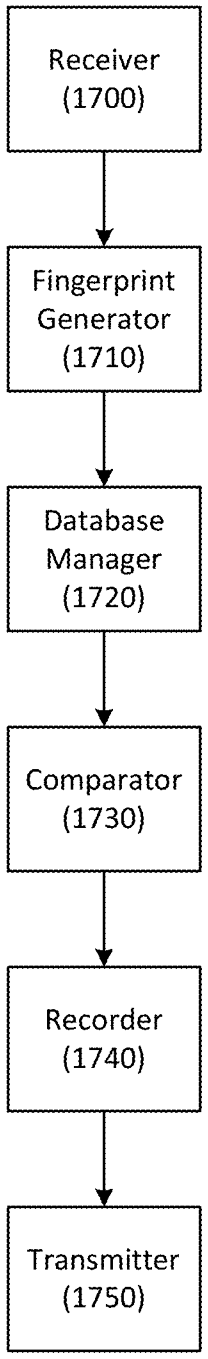
FIG. 17 depicts a further example computing system for processing received digital signatures.

FIG. 17 depicts a further example computing system for processing received digital signatures. The computing system comprises a receiver 1700, a fingerprint generator 1710, a database manager 170, a comparator 1730, a recorder 1740, and a transmitter 1750. In an embodiment, components 1700-1750 are implemented as hardware modules, software modules, or a combination thereof within the server 140. For example, the computer readable medium of the server 140 can comprise instructions that, when executed on the processor 1602, cause the server 140 to provide the functionalities of components 1700-1750. In another example, the FPGA 1614, the PLDs, or the ASICs can be configured to implement the comparator 1730.

Figure 18:
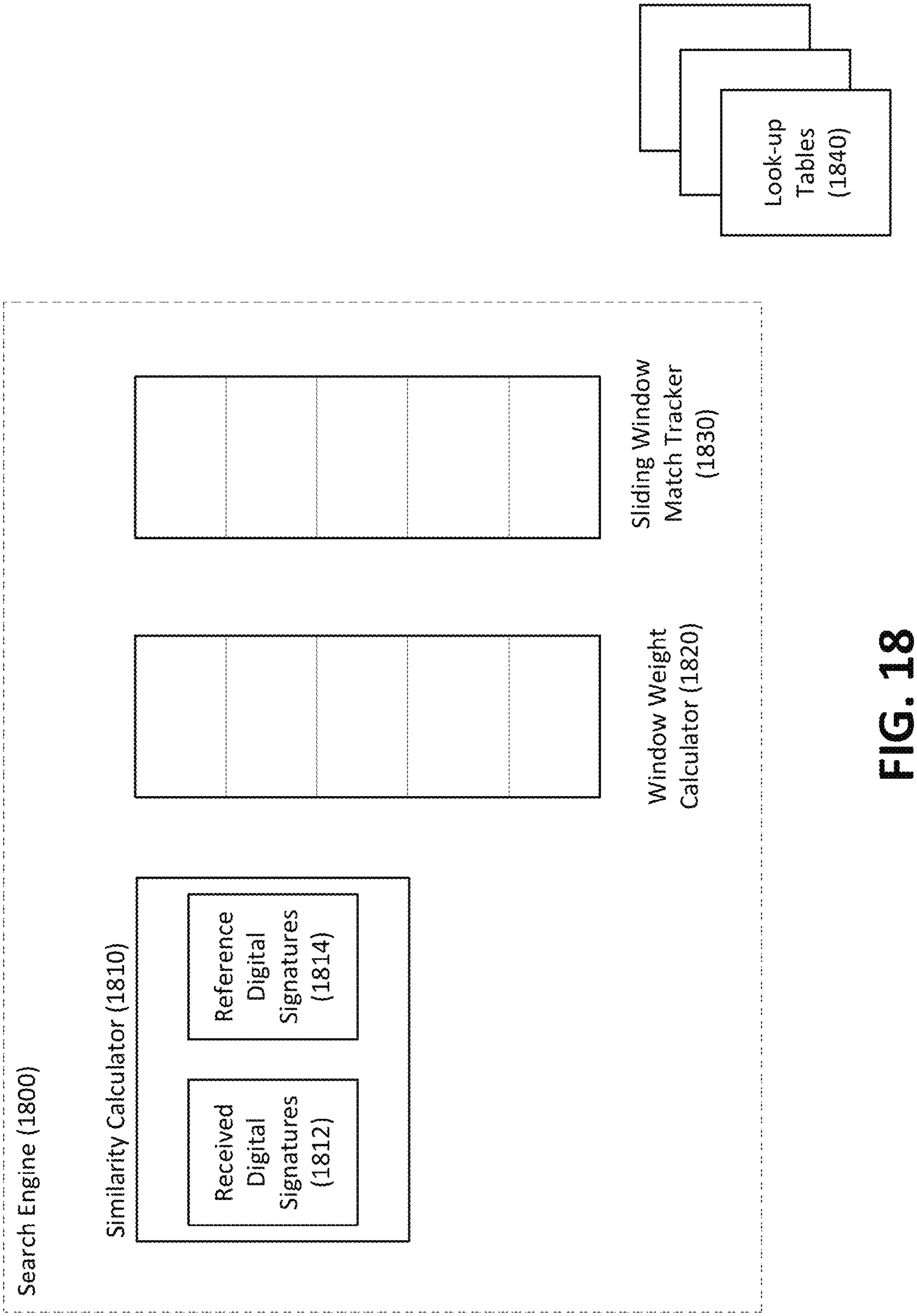
FIG. 18 depicts an example field programmable gate array configuration for comparing and matching digital signatures.

In an embodiment, the comparator 1730 comprises a search engine 1800 and look-up tables 1840 as shown in FIG. 18. The look-up tables can be stored in the system memory 1604 and can comprise thresholds provided to the search engine 1800 for comparing and matching digital signatures. The search engine 1800 can be implemented in the FPGA 1614 and can comprise a similarity calculator 1810, a window weight calculator 1820, a sliding window match tracker 1830, and a memory (not shown). In an example, the search engine 1800 comprises 2kx144 memory and stores reference digital signatures 1814. The search engine 1800 also comprises eight similarity calculators 1810 such that a reference digital signature 1814 is compared to eight received digital signatures 1812 in each clock cycle. The search engine 1800 begins by reading a reference digital signature 1814 from the first memory address (address 0) and comparing the digital signature 1814 to the received digital signature 1812. In the following clock cycle, the subsequent address is read and another comparison is done. In 2,048 clock cycles, the search is complete.

Figure 19:
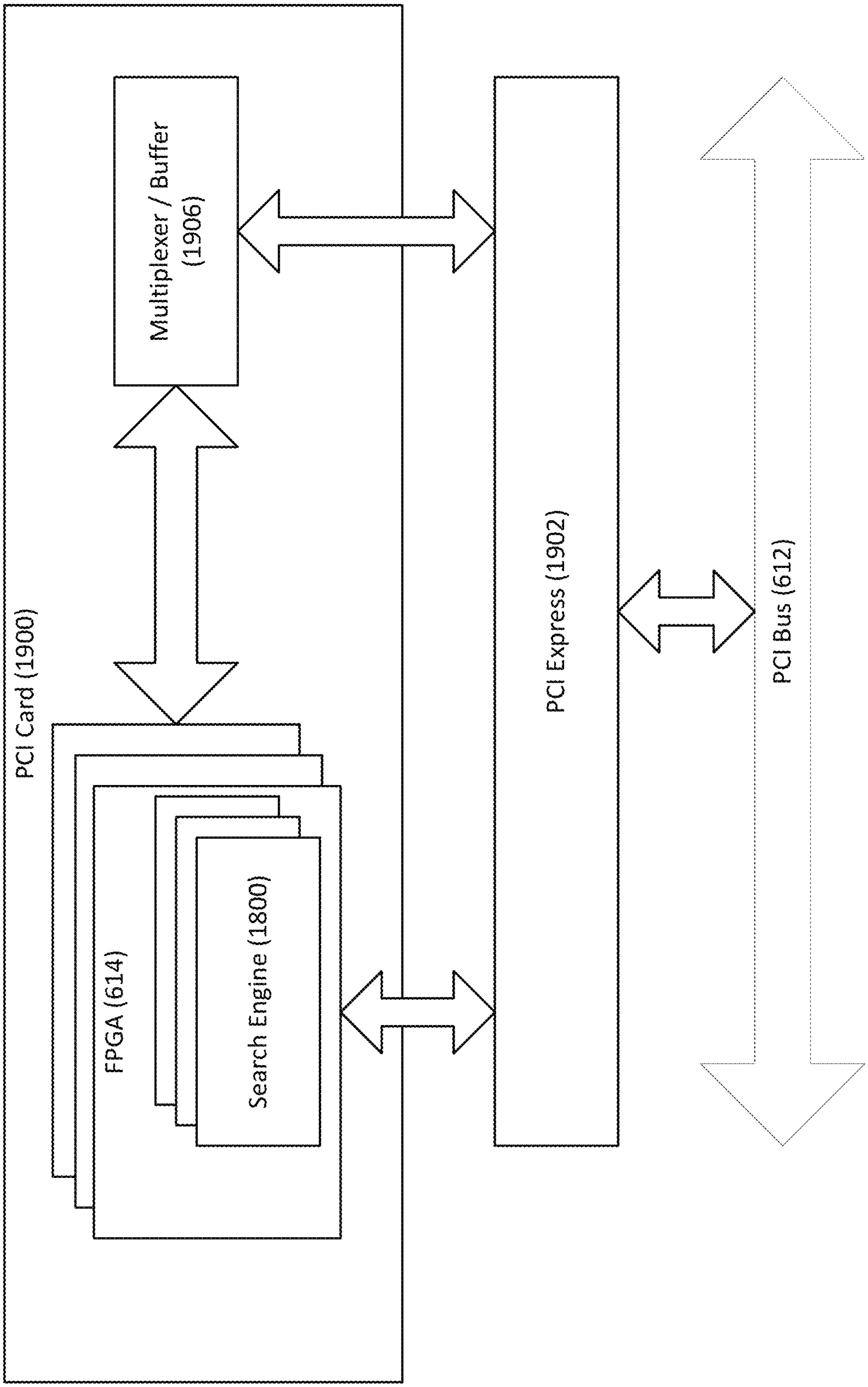
FIG. 19 depicts a further example field programmable gate array configuration for comparing and matching digital signatures.

In a further embodiment, the FPGA 1614 can comprise a plurality of search engines 1800 as shown in FIG. 19. For example, 48 search engines can be implemented within one FPGA 1614 to process the received digital signatures in parallel and independently of each other's processing. Additionally, multiple FPGAs 1614 can be implemented within the server 140. For example, four FPGAs 1614 can reside within the server 140 providing 192 search engines. In an example, a peripheral component interconnect card 1900 (PCI card) can be used to comprise a plurality of FPGAs 1614, such as five FPGAs 1614. The PCI card 1900 can interface with components 1602-1612 through the interface bus 1612. A PCI Express 1902 (PCIe) can be also used and configured to provide an interface between the PCI card 1900 and the interface bus 1612, to move data on and off the PCI card 1900, and to control the overall operation. In an example, the PCIe 1902 can be integrated within the interface bus 1612. The PCI card 1900 can also comprise a multiplexer/buffer 1906 configured to monitor the search engines 1800 for matches found between data compared thereat and to store the results in the buffer for subsequent reading by the processor 1602. In another embodiment, a circuit board can be configured to comprise a plurality of FPGAs 1614 interconnected with high speed link and each comprising a plurality of search engines 1800.

The following example illustrates the benefits of the described FPGA architecture. In this example, 300 million received digital signatures 1812 are compared to 10 million reference digital signatures 1814 at a system clock speed of 200 MHz and a data transfer rate of 200 Mbytes/sec, wherein each of the digital signature comprising 144 bits.

Given the system clock speed of 200 MHz, each search engine 1800 can perform:

$$200\times10^6\left(\frac{clks}{s}\right)\times8\left(\frac{\text{compares}}{clk}\right)=1.6\times10^6\frac{\text{compares}}{\text{second}}$$

With 192 search engines 1800, each holding 2,048 reference digital signatures 1814, a total of $$192\times2.048=393,216$$

or 393 k samples can be processed in a single pass of the FPGA memory by running all 300 million received digital signatures 1812 against it. This requires processing the data in multiple passes, until all of the 10 million reference digital signatures 1814 have been processed. The number of passes is:

$$\frac{10\times10^6}{395\times10^3}=25\text{ passes}$$

In each pass, eight received digital signatures 1812 are compared in each of the search engines 1800 every 2,048 clock cycles. To run all 300 million received digital signatures 1812 through all search engines 1800, each pass takes:

$$\left(\frac{300\times10^6}{8}\right)\times\left(\frac{2{,}048}{200\times10^6}\right)=384\text{ seconds.}$$

Therefore, comparing 300 million received digital signatures 1812 to ten million reference digital signatures 1814 takes 25×384=9,600 seconds.

In addition, the 10 million reference digital signatures 1814 can be loaded at a rate of 200 Mbytes/sec into the FPGA search engine memories, which requires a total time of $$\left(\frac{144\text{ bits}}{8\frac{\text{bits}}{\text{bytes}}}\right)\times\left(\frac{10\times10^6}{200\times10^6}\right)=0.9\text{ seconds.}$$

This indicates that the cumulative memory load time is negligible. Further, transferring received digital signatures 1812 to FPGA comprises transferring eight received digital signatures 1812 every 2,048 clock cycles. This gives a throughput requirement of:

$$8\times\left(\frac{144\text{ bits}}{8\frac{\text{bits}}{\text{bytes}}}\right)\times\left(\frac{200\times10^6}{2{,}048}\right)=14.1\times10^6\frac{\text{bytes}}{\text{second}}.$$

Therefore, the transfer rate of the received digital signature 1812 only needs to be 14.1 Mbytes/sec which is supported by the 200 Mbytes/sec throughput rate, indicating that there are no bottlenecks associated with transferring data during the passes.

Functionalities of the components 1700-1750 will be described herein below in light of FIG. 20. In an embodiment, the receiver 1700 is configured to receive data transmitted from the personal electronic device 100, at operation 2002. The received data includes digital signatures and additional information appended to the digital signatures. In an example, the received digital signatures comprise bit streams, fingerprints, or a combination thereof. The fingerprint generator 1710 is configured to process the received data to generate fingerprints thereof. The generated fingerprints are referred to as meter fingerprints. The fingerprint generator 1710 retrieves the digital signatures from the received data. If the digital signature comprises bit streams, at operation 2004, the generator 1710 generates the meter fingerprints from the bit streams using similar techniques as described herein above. If the digital signatures comprise fingerprints, the fingerprint generator 1710 sets the received fingerprints as the meter fingerprints.

The database manager 1720 is configured to also process the received data to retrieve information associated with the digital signatures. The retrieved information is based on the additional appended information and can comprise, for example, the classification associated with the digital signatures, the times when the digital signatures were created, and the geographic locations of the personal electronic device 100 at those times. At operation 2006, the database manager 1720 uses the retrieved information to search and retrieve reference fingerprints from a database associated with the server 140. For example, when the classification is silence, white noise, or conversation, the database manager 1720 need not retrieve reference fingerprints. Instead, the database manager 1720 indicates to the server 140, or the other components 1730-1750, that no reference fingerprints are retrieved. In turn, instead of comparing and matching the meter and reference fingerprints, the server 140 transmits an indication to the personal electronic device 100 identifying the classification. When the classification is for music, television shows, etc., the database manager 1720 only retrieves fingerprints corresponding to that classification. In another example, the database manager 1720 can utilize the classification, the time, the geographic location, or a combination thereof to retrieve a subset of reference fingerprints from the database. To illustrate, the classification may be for a television show, the time may indicate that the meter fingerprints were generated on a specific date at 7:05 pm, and the geographic location may be associated with a specific city. The database manager 1720 combines the three parameters to search the database for reference fingerprints that are associated with television shows broadcasted in the city at a time range covering the specific date.

The reference fingerprints comprise fingerprints of reference media, such as audio, generated under controlled conditions. Similar fingerprinting techniques as described herein above can be applied to undistorted media to generate the reference fingerprints. In an embodiment, the server 140 can generate and store the reference fingerprints in the database. The server 140 can also receive the reference fingerprints from a source, such as an entity that created the media. For example, to generate the reference fingerprints, media can be loaded to the server 140, which in turn can generate the reference fingerprints from the loaded media. In such an example, the media processed by the server 140 is not subject to distortions or channel interferences as compared to the media transmitted from the data source 180 to the personal electronic device 100. In another example, a computing device can be exposed to the media in an environment with known characteristics. The computing device can correct the received media for distortions associated with the known characteristics, can generate the reference fingerprints from the corrected media, and can transmit the reference fingerprints to the server 140. Any other techniques can be used to minimize the media distortion such that the generated reference fingerprints represent the media accurately and with minimum error.

The generated meter fingerprints and the retrieved reference fingerprints are transmitted to the comparator 1730. The comparator 1730 is configured to compare the meter and reference fingerprints at operation 2008 and to determine whether there is a match between the compared fingerprints at operation 2010. For example, the comparator 1730 can compare the fingerprints bit-by-bit for similarity and can declare that there is a match when the similarity meets a certain threshold or falls within a certain range. The used threshold or range allows the comparator 1730 to account for errors in the fingerprints. The errors may be due to the distortion of the media when the personal electronic device 100 was exposed thereto. The errors may also be caused by other conditions such as errors in the processing or errors resulting from the transmission of the data from the personal electronic device 100 to the server 140.

When a match between the compared fingerprints is found, the recorder 1740 is configured to record the match at operation 2012. The match can be recorded, for example, in the JUKED data exposure database 144. The recorded match can comprise the matched reference fingerprint or an indicator thereto. The indicator can be, for example, an address of the reference fingerprint in the database comprising the reference fingerprints. The recorder 1740 is also configured to retrieve information associated with the match at operation 2014. The information may be stored on a database associated with the server 140 and may comprise a description of the media associated with the match. The description includes, for example, the title, album, logo, pictures, author, performer, producer, date of release, upcoming performances, retailers, and the like associated with the media. The description may be in the form of metadata associated with the media. The recorder 1740 may record the retrieved information with an association to the match in the JUKED data exposure database. The recorder 1740 is also configured to generate media information at operation 2016. The generated media information may be based on the match, the retrieved information, and the data appended to the digital signature associated with the matched meter fingerprint. For example, the recorder 1740 generates two sets of media information. A first set may be directed for transmission to the personal electronic device 100 and a second set may be directed for transmission to the third party 160. The first and second sets may be the same or may be different. The first set may comprise, for instance, an indication that there is a match, the description of the match, and the time when the personal electronic device 100 was exposed to the media. The second set may comprise, for instance, the title of the media, the time when and the location where the personal electronic device 100 was exposed to the media, and the source of the media. The media information can be sent to the transmitter 1750.

The transmitter 1750 is configured to transmit the media information, such as the first set, to the personal electronic device 100 at operation 2018. The transmitter 1750 may adjust the transmission based on various parameters. For example, the transmitter 1750 can compress the media information or update the data transmission rate. The various parameters comprise parameters associated with the media information such as its size, with the server 140 such as available resources within the server 140 and the size and number of matches being processed therethrough, with the network 120 such as the available bandwidth, and with the personal electronic device 100 such as the transmission rate and the time of the data received from the personal electronic device 100. The transmitter 1750 is also configured to transmit the media information, such as the second set, to the third party 160 at operation 2020. The transmission can be based on the type and configuration of the connection between the server 140 and the third party 160. For example, the server 140 may collect the media information from a plurality of personal electronic devices and transmit the collected information to the third party 160 on a periodic basis or upon request. Personal information relating to or identifying users of the personal electronic devices may be removed from the collected information prior to the transmission to the third party 160.

Figure 21A:
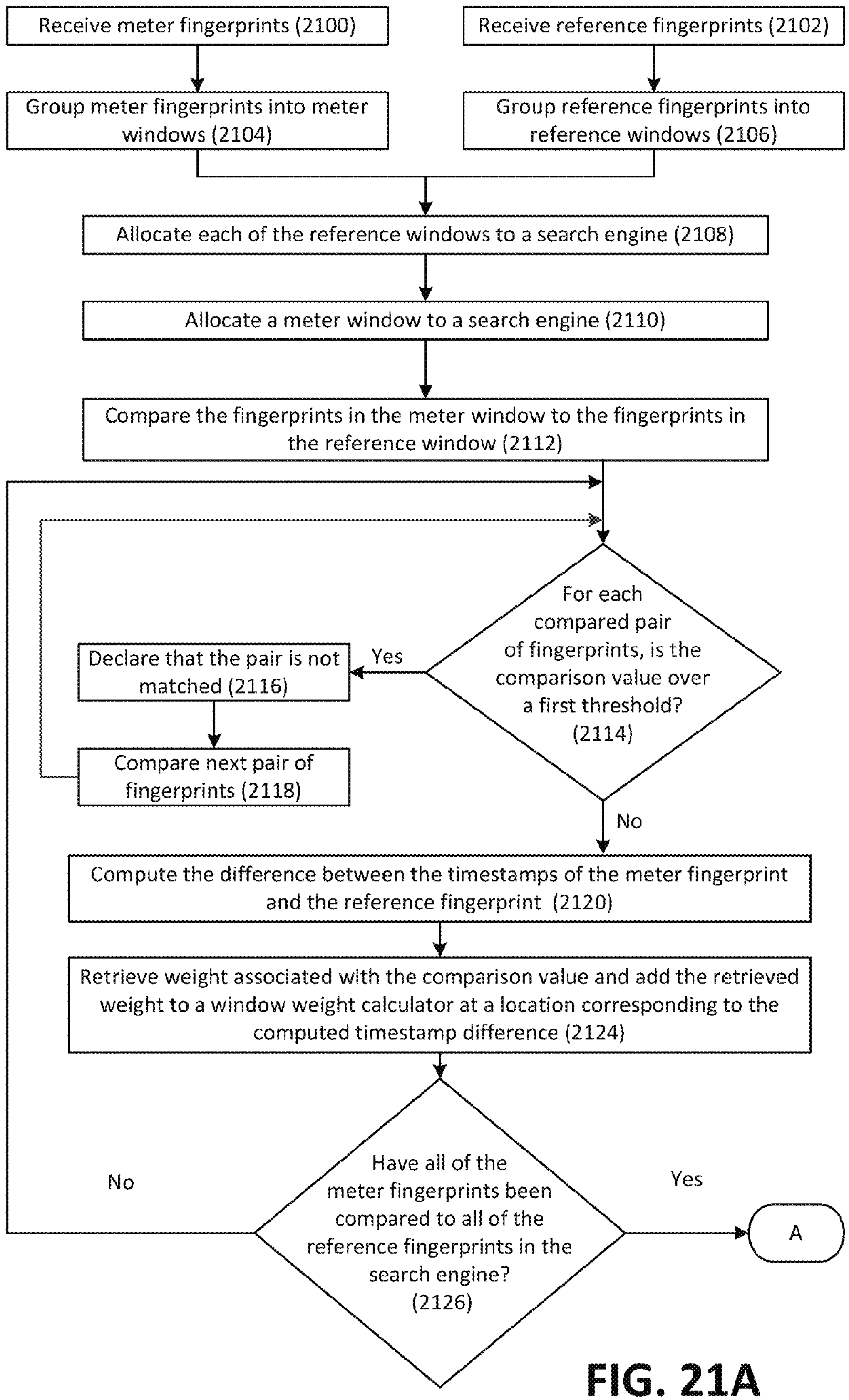
FIGS. 21A-C depict a further example functional flow for comparing and matching digital signatures.
Figure 21B:
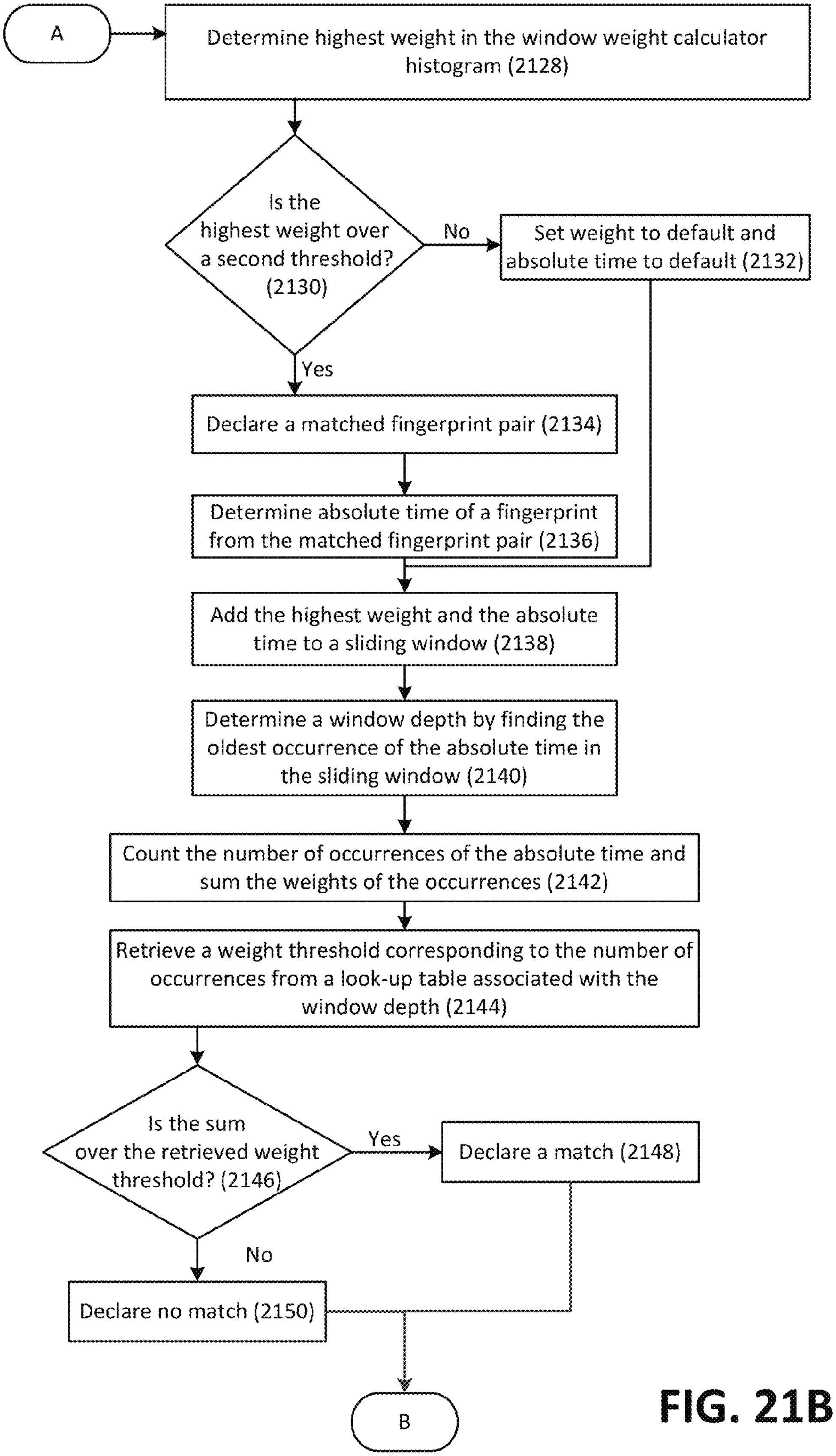
Figure 21C:
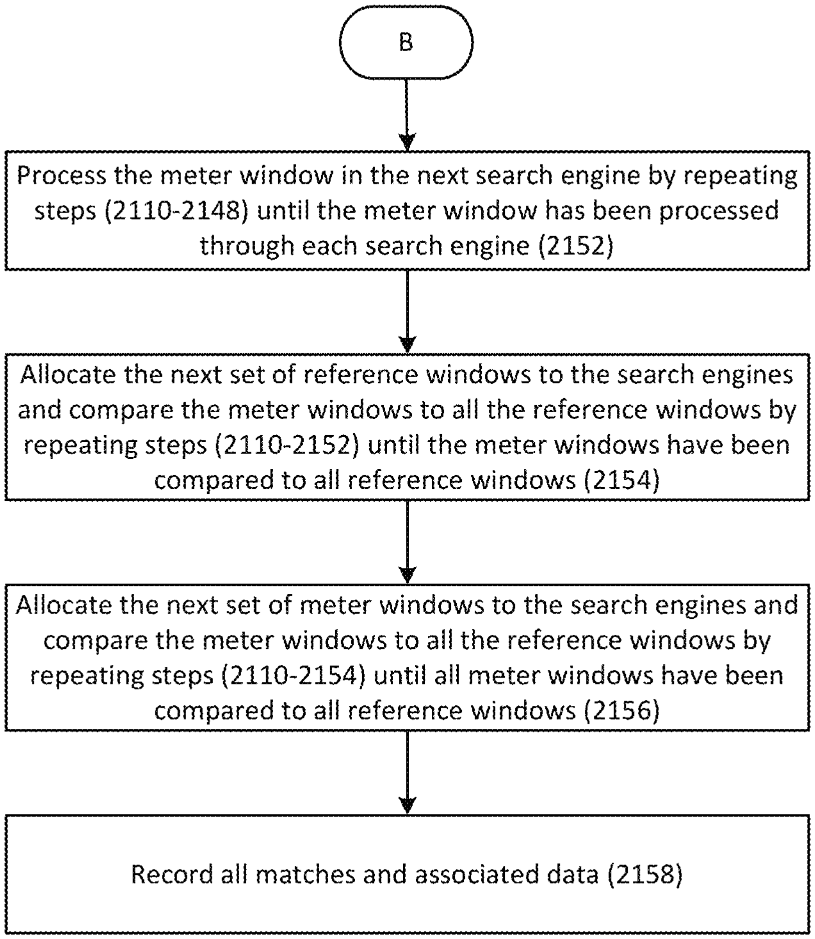

FIGS. 21A-C depicts a further example functional flow for comparing and matching digital signatures. One skilled in the art will appreciate that, for this and other operational procedures and methods disclosed herein, the operations and methods may be implemented in a different order or on other computing devices, or shared between the personal electronic device 100, the server 140, and the third party 160. Furthermore, the outlined operations are only provided as examples, and some operations may be optional, combined into fewer operations, or expanded into additional operations.

Figure 20:
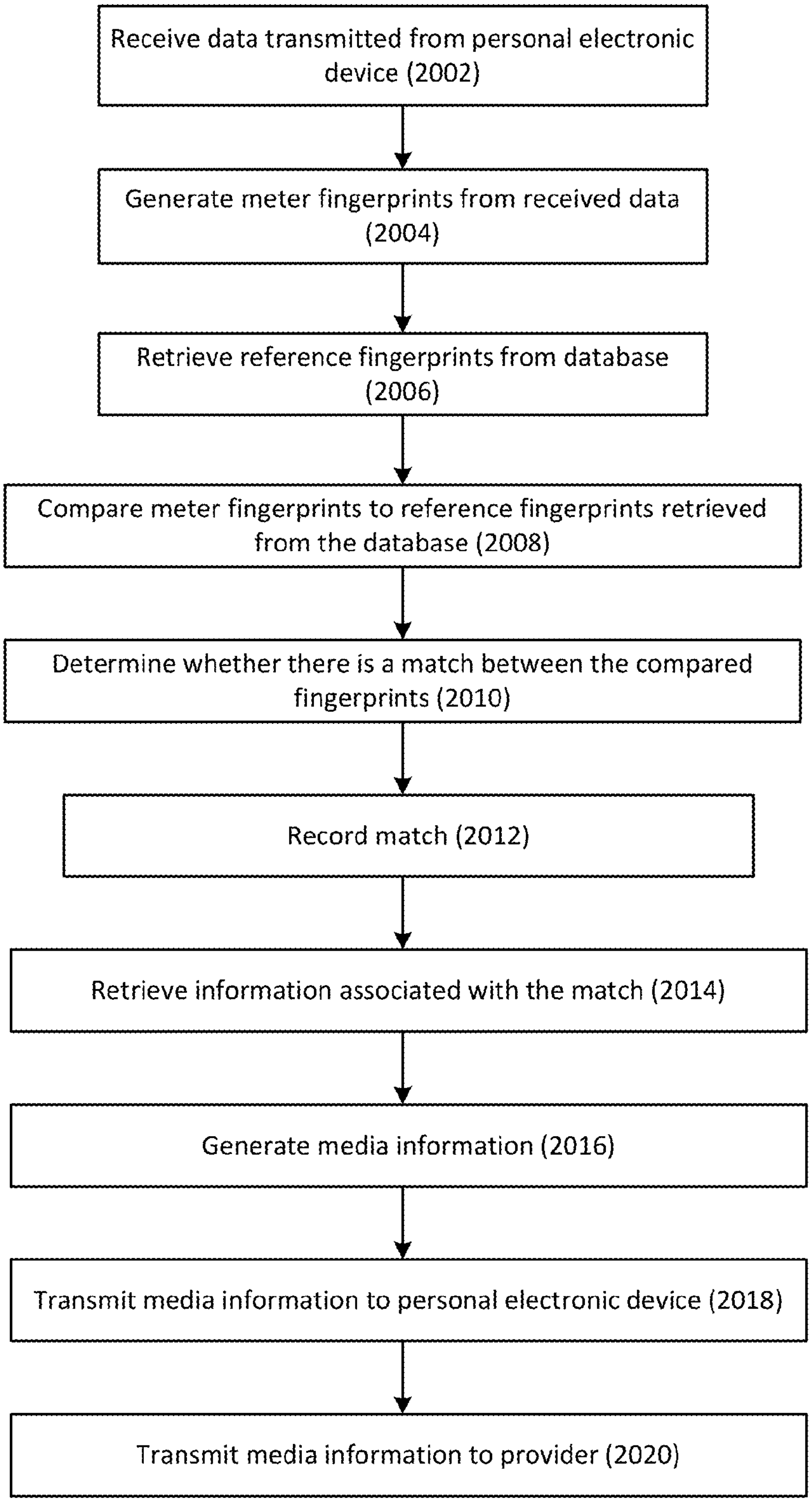
FIG. 20 depicts an example functional flow for comparing and matching digital signatures.
Figure 22:
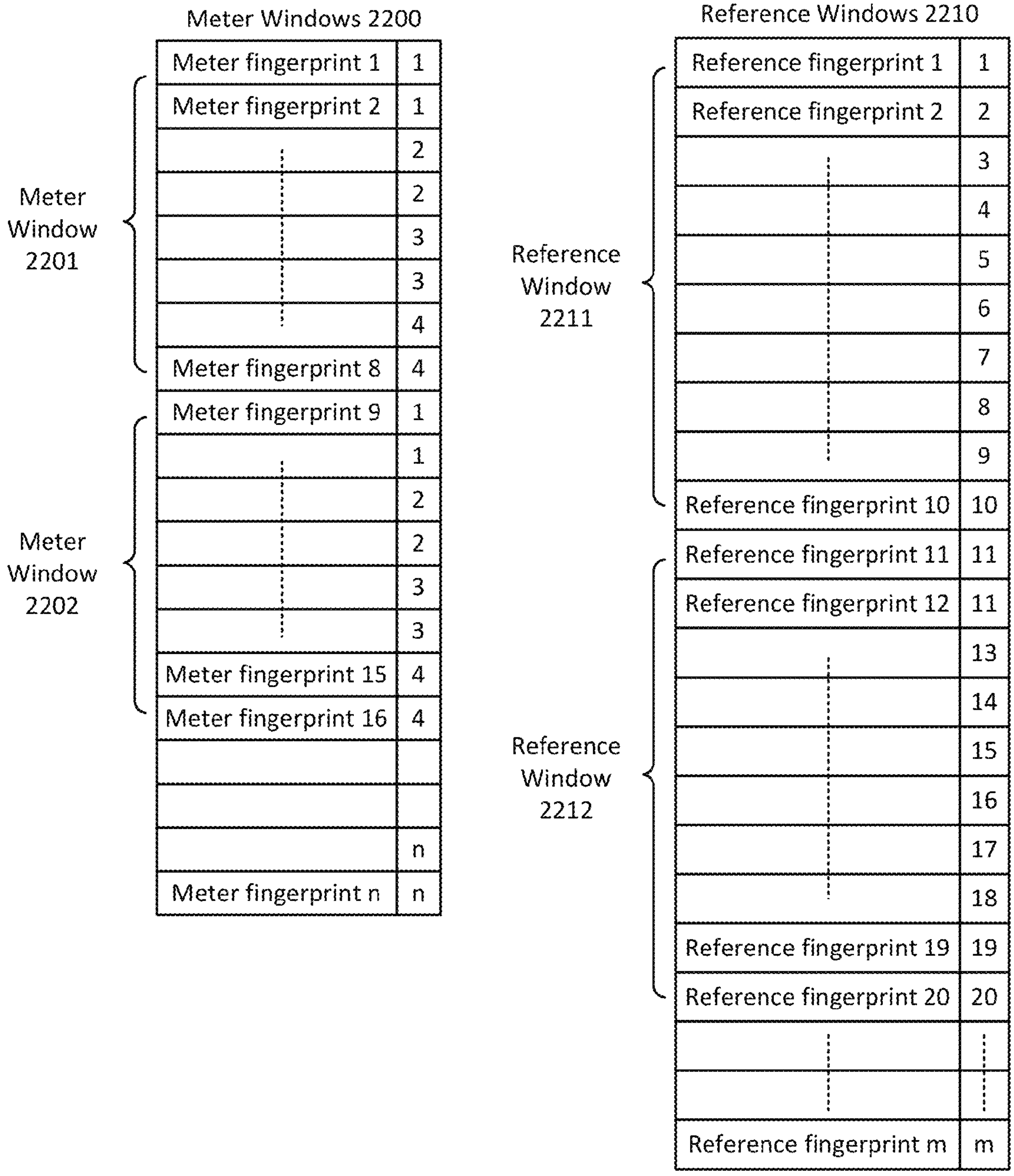
FIG. 22 depicts example windows for comparing meter and reference fingerprints.

In an embodiment, operations 2100-2158 are implemented in the comparator 1730 and recorder 1740 and are comprised in operations 2008-2016 of FIG. 20. Operations 2100 and 2102 describe receiving meter fingerprints and reference fingerprints, respectively. The fingerprints can be received, for example, from the database manager 1720. At operation 2104, the meter references are grouped into meter windows. An example of meter windows is shown in FIG. 22. The meter windows 2200 comprise a matrix that lists the meter fingerprints associated with respective timestamps. The timestamps can be derived from the data appended to the received digital signatures. For example, the timestamps can be associated with the time when the digital signature was generated at the personal electronic device 100. Such timestamp can be referred to as the absolute time. In another example, the timestamps can represent the relative time of a fingerprint to an adjacent fingerprint. In other words, the timestamp of the first fingerprint in the meter windows 2200 may be associated with the time when the corresponding digital signature was generated at the personal electronic device 100. The timestamp of the second fingerprint in the meter windows 2200 can be associated with the time difference relative to the timestamp of the first fingerprint. The timestamp of the third fingerprint in the meter windows 220 can be associated with the time difference relative to the timestamp of the second fingerprint or the timestamp of the first fingerprint. The time difference can be derived from the parameters used by the personal electronic device 100 for generating the digital signatures. Typically, the timestamps are sub-seconds or few seconds apart. The parameters may be appended to the digital signatures received at the server 140. To illustrate, the first fingerprint may be created at 10:36:00 am, the second fingerprint at 10:36:02 am, and the third fingerprint at 10:36:03 am. As such, the timestamp of the first fingerprint may be set to "0," the "0" being associated with 10:36:00 am. The timestamp of the second fingerprint may be set to "2," the "2" being associated with 10:36:02 am and the timestamp of the third fingerprint may be set to "3," the "3" being associated with 10:36:03 am. This process is repeated until all meter fingerprints in the meter windows 2200 are associated with timestamps.

The meter windows 2200 may also be divided into a plurality of meter windows, such as meter window 2201 and meter window 2202 as shown in FIG. 22. Each of the meter windows may comprise an identifier that describes the location of the meter window within the meter windows 2200. The identifier may be the number of the meter window or may be the timestamp associated with the first fingerprint in the meter window. For example, meter window 2201 may be assigned an identifier of "1" indicating that meter window 2201 is sequentially the first in the list, whereas meter window 2202 may be assigned an identifier of "2" indicating that meter window 2202 is sequentially after meter window 2201. The number of meter fingerprints in each of the meter windows can vary depending on various factors, including the total number of meter fingerprints and the available resources at the server 140. For example, the number can be eight as shown in FIG. 22 or any other number. The number can be also set to span a certain amount of time, for example, grouping meter fingerprints that correspond to 15 seconds of audio in a meter window.

At operation 2106, reference windows 2210 can be generated following a similar process as the one described herein above. The reference windows 2210 comprise reference fingerprints associated with timestamps. As shown in FIG. 22, the reference windows 2210 may comprise a plurality of reference windows, such as reference window 2211 and reference window 2212, each of which may comprise a list of reference fingerprints and timestamps and may be associated with an identifier. The number of reference fingerprints in a reference window need not match the number of meter fingerprints in a meter window. For example, reference window 2211 can span reference fingerprints that correspond to 300 seconds of reference audio whereas meter window 2212 can span meter fingerprints that correspond to 15 seconds of meter audio. In another example, reference window 2212 can comprise 1,000 reference fingerprints whereas meter window 2202 can span 24 meter fingerprints. Also, the number of windows within reference windows 2210 need not match the number of windows within meter windows 2200.

At operation 2108, the reference windows 2210 are allocated to search engines 1800. In an embodiment, the windows within reference windows 2210 is allocated to a search engine 1800. For example, in an FPGA 1614 that comprises four search engines, reference window 2211 is allocated to a first search engine 1800 and reference window 2212 is allocated to a second search engine 1800. At operation 2110, the windows within meter windows 2202 are allocated to search engines 1800. In an embodiment, each of the meter windows 2200 can be allocated to a search engine. For example, the FPGA 1614 that comprises four search engines, meter window 2201 is allocated to a first second engine 1800 and meter window 2202 is allocated to a second search engine.

At operation 2112, the meter fingerprints are compared to the reference fingerprints. In other words, within a search engine 1800 comprising a meter window and a reference window, a meter fingerprint from the meter window is compared to a reference fingerprint in the reference window. This comparison can be repeated until each of the meter fingerprints is compared to each of the reference fingerprints. The comparison can be a bit-by-bit comparison that counts the number of bit locations in which the bits of the two fingerprints are the same. In an embodiment, the comparison is implemented as XOR and sum functions within FPGA 1614. The two fingerprints are XOR'ed, the resulting bits are summed, and the sum is set as the value of the comparison. As such, the more similar the two fingerprints are, the smaller the value is. For example, if each of the fingerprints is 80 bits and the two fingerprints perfectly match, the value is "0." If the two fingerprints differ by two bits, the value is "2."

At operation 2114, the value of the comparison is compared to a first threshold. The threshold can be predefined, such as 20% of the bit length of a fingerprint (e.g., 16 for an 80 bit fingerprint) or can be dynamically adjusted based on the size of the fingerprints and parameters received from the personal electronic device 100. The parameters can indicate, for example, a level of distortion of the media that the personal electronic device 100 is exposed to. For a high distortion level, the threshold can be increased whereas, for a low distortion level, the threshold can be decreased. When the comparison value is larger than the first threshold, the compared fingerprints are declared not be matched at operation 2116 and the next pair of meter and reference fingerprints are compared at operation 2118.

When the comparison value is lower than the first threshold, the difference between the timestamps corresponding to the compared meter and reference fingerprints is computed at operation 2120. To illustrate, meter window 2201 and reference window 2211 are allocated to the same search engine. The first meter fingerprint may have a timestamp of "1," the seventh meter fingerprint may have a timestamp of "3," the second reference fingerprint may have a timestamp of "2" and the sixth reference fingerprint may have a timestamp of "6." If the first meter fingerprint was compared to the sixth reference fingerprint, and the comparison value was lower than the first threshold, the difference between the timestamps is "5." Similarly, if the seventh meter fingerprint was compared to the second reference fingerprint and the comparison value was lower than the first threshold, the difference between the timestamps is "−1." In an embodiment, to avoid negative timestamp differences, the computed difference can be offset by a value corresponding to the timestamp computed based on the last reference fingerprint in the reference window and the first meter fingerprint in the meter window. To illustrate, the first meter fingerprint in meter window 2201 has a timestamp of "1" and the last reference fingerprint in reference window 2211 has a timestamp of "10." The resulting offset is "9." As such, the computed timestamp differences of "4" and "−1" become "13" and "8," respectively.

Figures 23, 24:
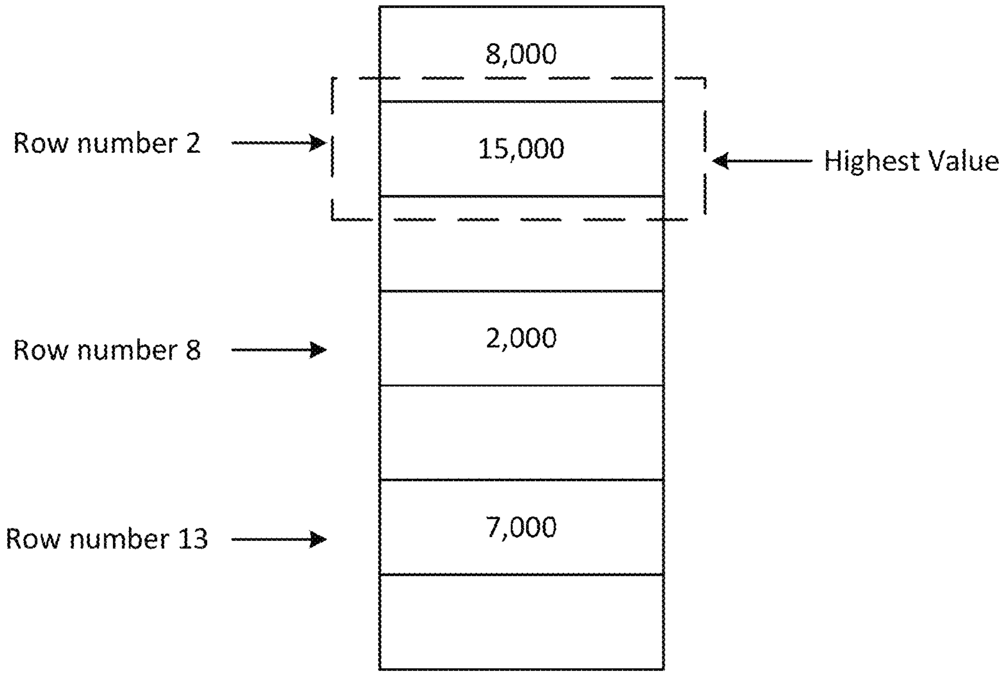
FIG. 23 depicts an example look-up table for determining similarity weights.
FIG. 24 depicts an example weight histogram for determining a largest similarity weight.

At operation 2124, a weight associated with the comparison value is retrieved using a look-up table, such as a look-up table 1840, and the retrieved weight is added to a window weight calculator, such as window weight calculator 1820, at a location corresponding to the computed timestamp difference. An example look-up table is shown in FIG. 23. Look-up table 2300 comprises two columns: a first column that lists the comparison values and a second column that lists the corresponding similarity weights. The length or number of rows of look-up table 2300 can correspond to the value of the threshold. For example, for 80 bits fingerprints with a 20% threshold, look-up table 2300 comprises 16 rows of comparison values and similarity weights. Because the comparison value is associated with the bit similarity between the compared fingerprints, the lower the comparison value is, the more similar the bits are, and thus, the higher the similarity weight is. The window weight calculator 1820 may comprise a window weight histogram 2400 shown in FIG. 24. The number of rows in the window weight histogram 2400 is equal to the timestamp difference between the first meter fingerprint in the meter window and the last reference fingerprint in the reference window. The window weight calculator can be configured to add the similarity weight associated with the comparison value to the window weight histogram 2400 at a location or a row that corresponds to the computed timestamp difference. The similarity weight is added to any pre-existing weight at that location of the window weight histogram 2400. Continuing with the example of the compared fingerprints from meter window 2201 and reference window 2211, the comparison value and the timestamp difference of the first meter fingerprint—sixth reference fingerprint pair (first pair) are "1" and "13," respectively. Similarly, the comparison value and the timestamp difference of the seventh meter fingerprint—second reference fingerprint pair (second pair) are "2" and "8," respectively. As such, the similarity weight of the first pair is "6,000" and the similarity weight of the second pair is "2,000" as retrieved from look-up table 2300. The similarity weight of the first pair is added to an existing weight of "1,000" at row number thirteen in the window weight histogram 2400 resulting in a weight of "7,000" at that location. Likewise, the similarity weight of the second pair is added to an existing weight of "0" at row number eight in the window weight histogram 2400 resulting in a weight of "2,000" at that location.

Operation 2124 may be followed by operation 2126. At operation 2126, a determination is made whether all the fingerprints in a search engine have been compared. In other words, each of the meter fingerprints in the meter window allocated to a search engine 1800 needs to be compared to each reference fingerprint in the reference window allocated to the same search engine 1800. As the fingerprints are compared, the window weight histogram 2400 is updated as described herein above. Operations 2112 through 2126 are repeated until all the fingerprints have been compared. When all the fingerprints have been compared, operation 2126 may be followed by operation 2128.

At operation 2128, the highest weight in the window weight histogram 2400 is determined. For example, as shown in FIG. 24, the highest weight is "15,000" at row number "2." At operation 2130, the highest weight is compared to a second threshold. The second threshold can be predetermined or can be dynamically adjusted using similar parameters as the ones used for the first threshold. The higher the value of the second threshold is, the more immune the system is against errors caused by distortion. When the highest weight is less than the second threshold, a default weight and a default time are used for the highest weight and absolute time, respectively, at operation 2132. The default weight may be a "−1" and the default time may be a "0." When the highest weight is over the second threshold, a window pair may be declared to be matched at operation 2134. The matched window pair comprises the compared meter window and the reference window that resulted in the highest weight over the second threshold At operation 2134, when multiple pairs of fingerprints (a meter fingerprint and a reference fingerprint being a pair of fingerprints) contributed to the highest weight, any or all of the contributing pairs are declared as match candidates. The pairs can be tracked based on the number of the row that comprises the highest weight in the window weight histogram 2400. For example, as the rows in the window weight histogram 2400 are populated, the window weight calculator 1820 records, in a matrix, the timestamps of the meter and reference fingerprints that are associated with the weights being added per row of the window weight histogram 2400. When the row with the highest weight is determined, the window weight calculator 1820 retrieves from the matrix the timestamps of the fingerprints associated with that row. The timestamps are used to derive from the meter and reference windows the corresponding fingerprints. Any or all of the determined fingerprints can be declared match candidates. For example, the pair that has the first weight added to the row with the highest weight can be declared a candidate and the other pairs can be discarded. In another example, the pair that has a meter or reference fingerprint listed first (e.g., has the smallest timestamp) in the meter or reference window, respectively, can be declared a candidate. In a different example, the pair that has the largest weight added to the row with the highest weight is declared a candidate. In yet another example, a random pair can be chosen and declared a candidate. In a further example, all the pairs can be declared candidates.

In an embodiment and to further increase the system immunity to distortion, the matched window is further processed through operations 2136-2150. At operation 2136, a candidate fingerprint pair from the matched window pair is considered and an absolute time associated with a fingerprint thereof is determined. In an example, a reference fingerprint from the considered candidate fingerprint pair is selected and its absolute time is computed. In another example, a meter fingerprint thereof is selected instead and its absolute time is computed. The absolute time is associated with the time when the selected fingerprint was generated. The absolute time can be computed based on the timestamp of the selected fingerprint. For example, the timestamp of a selected reference fingerprint may be a time difference over the timestamp of the first reference fingerprint in the reference window. As the timestamp of the first reference fingerprint may be associated with the time when the first reference fingerprint was generated, the absolute time of the selected reference fingerprint can be derived therefrom by adding the timestamp to the absolute time of the first reference fingerprint.

Figure 25:
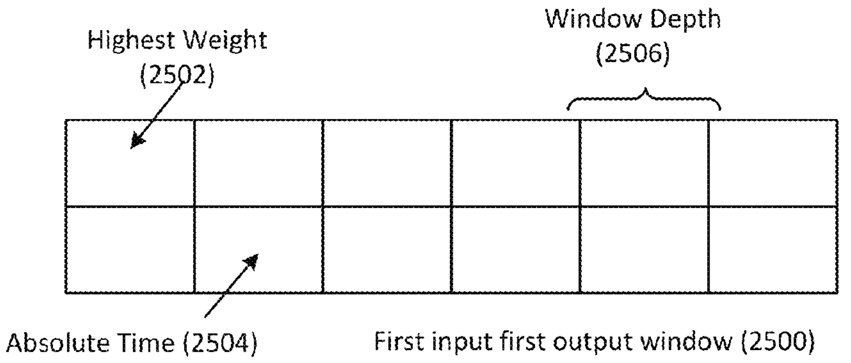
FIGS. 25A-B depict an example sliding window for determining matches between meter and reference fingerprints.

At operation 2138, the highest weight from operation 2128 and the absolute time from operation 2136 are inserted to a sliding window. The sliding window may be implemented in the sliding window match tracker 1830 of FIG. 18 and may comprise a matrix, referred to as first input first output (FIFO) window 2500 shown in FIG. 25A. FIFO window 2500 comprises a series of cells where one row of cells contain the highest weights and one row of cells contains the absolute times. Each of the inputs (an input being a highest weight and a corresponding absolute time) represents the result of the comparison of a meter window to a reference window. Inputs to FIFO window 2500 are populated sequentially, wherein the first column (e.g., utmost column to the left) represents the most recent input and the last column (e.g., the utmost column to the right) represents the oldest input. The most recent input is the result of the most recent comparison of a meter window to a reference window whereas the oldest input is the result of a previous comparison of another meter window to the same reference window. The result is the input from operation 2128 when a match is found at operation 2130 and the default input from operation 2132 when a match is not found at operation 2130. When a current comparison between a meter window and the reference is complete, the oldest input in the FIFO 2500 is dropped, existing inputs are shifted (e.g., shifted by one column to the left), and the most recent input (the input corresponding to the current comparison) is inserted in the first column. A window depth 2506 may also be associated with the FIFO window 2500. Window depth represents the order or location of the input within the FIFO window 2500. For example, as depicted in FIG. 25A, window depth 2506 corresponds to the column number of the input. A window depth of "4" indicates that the input is located in the fourth column of FIFO window 2500.

At operation 2140, when an input (highest weight and absolute time) is inserted as the most recent input in FIFO window 2500 based on operation 2138, a window depth is determined by finding the oldest occurrence of the absolute time of that input in FIFO window 2500. For example, when the input consists of a highest weight of "15,000" and an absolute time of "10," a search through the FIFO window 2500 is done to determine the window depth or cell location of the oldest occurrence of absolute time "10." At operation 2142, the number of occurrences of the absolute time of that input is counted and the corresponding weights are summed. Continuing with the previous example, the absolute time "10" may occur three times in the window; a first time being the most recent input or at window depth of "1", a second time at window depth of "2," and a third time corresponding to the oldest occurrence at a window depth of "4." The corresponding weights associated with the occurrences are "15,000, 6,400, and 11,202" respectively. Thus, in this example, the number of occurrences of absolute time "10" is "3" and the summed weight is "32,602."

At operation 2144, the number of occurrences is used to retrieve a look-up table. The look-up table may be a table implemented in look-up tables 1840 of FIG. 18 and may comprise, for example, look-up table 2600 of FIG. 26 or look-up table 2700 of FIG. 27. The look-up table is associated with the window depth. In an embodiment, for each potential window depth, there is a corresponding look-up table. In another embodiment, there is a look-up table for each potential window depth that is greater than a minimum number. Each look-up table lists a number of occurrences and a corresponding weight threshold. The number of occurrences is associated with how many times an absolute time occurs in FIFO window 2500. Because the number of occurrences of an absolute time depends on its window depth, the number of cells in a look-up table depends on the window depth. For example, as shown in FIG. 26, look-up table 2600 is associated with a window depth of "5" and thus comprises five rows containing a number of occurrences between "1 and 5." Each of the number of occurrences is associated with a weight threshold, wherein the weight threshold decreases as the number of occurrences increases. This weight threshold value to number of occurrences value correlation indicates that the more frequent an absolute time occurs in FIFO window 2500, the less the required weight threshold. This is because the likelihood that the fingerprint associated with the absolute time is an actual match is higher for higher number of occurrences. In other words, the more frequent an absolute time occurs, the more trustworthiness is associated with the corresponding fingerprint, and the less the required threshold is. Similarly, look-up table 2700 depicts a look-up table associated with a window depth of "4." In comparing look-up table 2700 and look-up table 2600, the weight threshold for a same number of occurrences is increased when the window depth is decreased. For example, a number of occurrences of "1" in look-up table 2600 of window depth of "5" has a weight threshold of "50,000." In comparison, that number of occurrences in look-up table 2700 of window depth of "3" has a weight threshold of "100,000." The increase in weight threshold with the decrease in window depth is associated with the trustworthiness accorded to the matched fingerprint. This is because the more often an absolute time occurs, the more likely its corresponding matched fingerprint is an actual match.

The window depth of an absolute time is used to retrieve the corresponding look-up table as explained herein above. For example, with a window depth of "4," look-up table 2700 is retrieved. The number of occurrences is used to retrieve the weight threshold from the retrieved look-up table. For example, with a number of occurrences of "3," the third weight threshold of "30,000" is retrieved from look-up table 2700. At operation 2406, the sum from operation 2142 is compared to the retrieved weight threshold from operation 2144. In other words, the sum of weights associated with the occurrences of an absolute time is compared to the weight threshold retrieved from a look-up table based on the window depth and number of occurrences of the absolute time. Continuing with the previous example, the sum of "32,602" is compared to the retrieved weight of "30,000." If the sum is greater than the retrieved weight threshold, a match is declared at operation 2148. Otherwise, a match is not declared at operation 2150. When a match is declared, the recorder 1740 can record the match and the related information as described herein above.

At operation 2152, the meter window is allocated to a next search engine, as described in operation 2110, and is compared to the reference window in that search engine, as described in operations 2112-2150. Operation 2152 is repeated until the meter window has been processed through the search engines, or in other words, until it has been compared to the reference windows allocated to the search engine. In an embodiment, the processing of the meter and reference windows is reversed. For example, instead of processing the meter window through the next search engine, the meter window is maintained in the same search engine and a new reference window is allocated to that same search engine for a comparison therewith.

At operation 2154, when the meter windows need to be compared with additional set of reference windows, a next set of reference windows are allocated to the search engines as in operation 2108, and operations 2110-2152 are repeated until the meter windows have been compared with all required reference windows. In an embodiment, the processing of the meter and reference windows is reversed. At operation 2156, when additional meter windows need to be compared to the reference windows, a next set of meter windows are allocated to the search engines as in operation 2110, and operations 2112-2154 are repeated until all required meter windows have been compared to all required reference windows. At operation 2158, the matches and associated data are recorded. For example, the recorder 1740 can record the matches and the related information as described herein above.

FIG. 25B provides an example illustrating the use of FIFO window 2500. In this example, the meter windows are compared to reference window 2211 of FIG. 22. First, meter window 2201 is compared to reference window 2211, a matched fingerprint is declared, and the reference fingerprint thereof is selected. The associated highest weight is "15,000" and the associated absolute time is "10." The values are inputted as the most recent input in FIFO window 2500 as shown in FIG. 25B. FIFO window 2500 is searched for the oldest occurrence of absolute time "10." The oldest occurrence is determined to be the most recent occurrence, the number of occurrences is determined to be "1," the window depth is determined to be "1," and the sum of the highest weights is "15,000." A look-up table for window depth of "1" is searched for a weight threshold associated with a number of occurrences of "1." The weight threshold is determined to be "200,000" which is greater than the sum of "15,000." Thus, no match is declared.

Second, meter window 2202 is compared to reference window 2211 and no match is found. The values in FIFO window 2500 are shifted by one column, dropping the utmost right input. Because no match was found, the default highest weight of "−1" and the default absolute time of "0" are entered in FIFO window 2500 as the most recent input. Also because no match was found, no further processing is required for this comparison.

Third, meter window 2203 is compared to reference window 2211, a matched fingerprint is declared, and the reference fingerprint thereof is selected. The associated highest weight is "2,000" and the associated absolute time is "10." The values in FIFO window 2500 are shifted by one column, dropping the utmost right input. The input is inserted as the most recent input. FIFO window 2500 is searched for the oldest occurrence of absolute time "10." The oldest occurrence is determined to be at window depth of "3," the number of occurrences is determined to be "2," and the sum of the highest weights is "17,000." A look-up table for window depth of "3" is searched for a weight threshold associated with a number of occurrences of "2." The weight threshold is determined to be "30,000" which is greater than the sum of "17,000." Thus, no match is declared.

Fourth, meter window 2204 is compared to reference window 2211, a matched fingerprint is declared, and the reference fingerprint thereof is selected. The associated highest weight is "200,100" and the associated absolute time is "5." The values in FIFO window 2500 are shifted by one column, dropping the utmost right input. The input is inserted as the most recent input. FIFO window 2500 is searched for the oldest occurrence of absolute time "5." The oldest occurrence is determined to be the most recent occurrence, the number of occurrences is determined to be "1," the window depth is determined to be "1," and the sum of the highest weights is "200,100." A look-up table for window depth of "1" is searched for a weight threshold associated with a number of occurrences of "1." The weight threshold is determined to be "200,000" which is less than the sum of "200,100." Thus, a match is declared. The selected reference fingerprint is recorded and the associated information is retrieved.

Fifth, meter window 2205 is compared to reference window 2211, a matched fingerprint is declared, and the reference fingerprint thereof is selected. The associated highest weight is "200" and the associated absolute time is "10." The values in FIFO window 2500 are shifted by one column, dropping the utmost right input. The input is inserted as the most recent input. FIFO window 2500 is searched for the oldest occurrence of absolute time "10." The oldest occurrence is determined to be at window depth of "5," the number of occurrences is determined to be "3," and the sum of the highest weights is "17,200." A look-up table, for window depth of "5" (e.g., look-up table 2600) is searched for a weight threshold associated with a number of occurrences of "3." The weight threshold is determined to be "18,000" which is greater than the sum of "17,200." Thus, no match is declared.

Sixth, meter window 2206 is compared to reference window 2211, a matched fingerprint is declared, and the reference fingerprint thereof is selected. The associated highest weight is "500" and the associated absolute time is "10." The values in FIFO window 2500 are shifted by one column, dropping the utmost right input. The input is inserted as the most recent input. FIFO window 2500 is searched for the oldest occurrence of absolute time "10." The oldest occurrence is determined to be at window depth of "6," the number of occurrences is determined to be "4," and the sum of the highest weights is "17,700." A look-up table, for window depth of "6" is searched for a weight threshold associated with a number of occurrences of "4." The weight threshold is determined to be "5,000" which is less than the sum of "17,700." Thus, a match is declared. The selected reference fingerprint is recorded and the associated information is retrieved.

In an embodiment, operations 2100-2158 can be executed at the personal electronic device 100 or can be distributed between the personal electronic device 100 and the server 140. For example, the server 140 can transmit reference fingerprints to the personal electronic device 100, which in turn, compares the reference fingerprints to meter fingerprints according to operations 2100-2158. In another example, the personal electronic device 100 uses a cache of reference fingerprints to compare meter fingerprints therewith according to operations 2100-2158. When the computing device 100 determines that no matches are found based on the comparison to the cached reference fingerprints, the computing device 100 may transmit the meter fingerprints to the server 140 for a comparison thereat with a larger set of reference fingerprints.

Although FIGS. 16-27 are described with references to receiving digital signatures associated with media, such as audio, at the server 140 from the personal electronic device 100, the present disclosure is not limited as such. The digital signatures can be associated with any data that comprises a stream of bits and for which reference digital fingerprints exist or can be generated. The digital signatures can be transmitted from any device, not limited to the personal electronic device 100, and can be received at any device, not limited to the server 140, wherein the devices are configured to carry the respective operations 200-220 of FIG. 2. For example, operations 2100-2158 can be used to compare and match digital signatures associated with fingerprints of human fingers, with human eye retinas, or with DNA sequences when expressed as a stream of bits.

Figure 28:
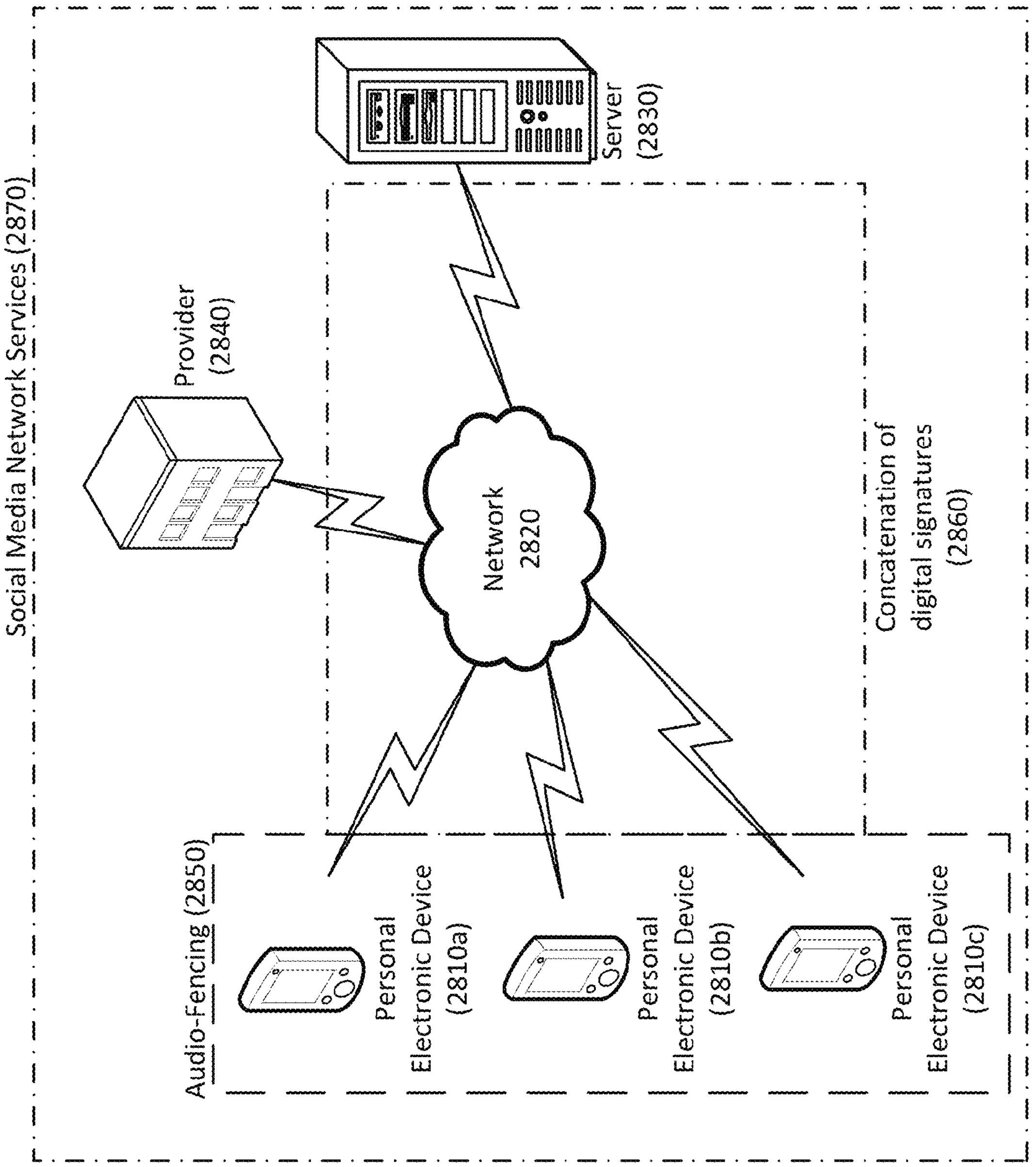
FIG. 28 depicts an example end-to-end multi-device system wherein aspects of the present disclosure can be implemented.

FIG. 28 depicts an example end-to-end multi-device system wherein aspects of the present disclosure can be implemented. The system comprises personal electronic devices 2810*a-c*, network 2820, server 2830, and provider 2840. Although only three personal electronic devices are shown, additional personal electronic devices can be comprised in the system. Each of the personal electronic devices can comprise some or all elements of personal electronic device 100. Similarly, network 2820 can comprise some or all elements of network 120, server 2830 can comprise some or all elements of server 140, and provider 2840 can comprise some or all elements of third party 160.

In an embodiment, an audio fencing 2850 application or service can be provided to personal electronic devices 2810*a-c* based on the data transmitted therefrom to the server 2830. For example, when the server 2830 determines that the personal electronic devices 2810*a-c* are within a certain distance range of each other, the server 2830 can instruct the personal electronic devices 2810*a-c* to share resources in generating and transmitting digital signatures. In one scenario, the server 2830 can instruct one of the personal electronic devices to generate and transmit the digital signatures and the remaining personal electronic devices to transmit data periodically or to stop transmission until further instruction. The periodically transmitted data can be used by the server 2830 to double-check that the personal electronic devices 2810*a-c* are still within the same distance range of each other at a subsequent time. In another scenario, the server 2830 can instruct the personal electronic devices 2810*a-c* to rotate roles in generating and transmitting digital signatures. The benefit of both scenarios is to save power and resources at the personal electronic devices 2810*a-c* associated with the generation of the digital signatures and power and resources at the server 2830 associated with processing redundant digital signatures. An additional benefit is saving bandwidth and cost associated with the transmission of redundant digital signatures. The server 2830 can determine whether the personal electronic devices 2810*a-c* are within the certain distance range of each other based on the received digital signatures and/or the appended data thereto. For example, the server 2830 can derive the geographic location of each personal electronic device from the data appended to the digital signatures. The server 2830 can also compare the matches of the personal electronic devices 2810*a-c* along with the absolute times associated with the matched meter fingerprints. The server 2830 can use any or all of that information to determine whether the audio-fencing needs to be enabled.

In an embodiment, concatenation of digital signatures 2860 application or service can be provided to the personal electronic devices 2810*a-c* and/or to the provider 2840. For example, the server 2830 can determine that users of personal electronic device 2810*a-c* are associated with each other by, for example, being on each other's social network contacts list. In such a scenario, the server 2830 concatenates the matched fingerprints associated with the personal electronic devices 2810*b-c* and returns the concatenation to the personal electronic device 2810*a* with an indication describing what the other friends or users are exposed to. In another example, the server 2830 can concatenate the matches of the personal electronic devices 2810*a-c* based on various factors and can transmit the concatenation to the provider 2840. The factors comprise, for example, the absolute time associated with the matched meter fingerprints, contexts of the personal electronic devices 2810*a-c*, and contexts of the users associated with the personal electronic devices 2810*a-c*. In other words, the server 2830 can concatenate a statistically sufficient number of matches or can concatenate matches from a statistically sufficient number of personal electronic devices 2810*a-c* to provide meaningful data to the provider 2840. In one scenario, the provider 2840 may request from the server 2830 data related to the data exposures of users that fit a certain demographic. The server 2830 may derive a list of users that fit the demographic requirements based on the received user contexts and may retrieve the corresponding matches and related information, concatenate the data, and provide the concatenated data to the provider 2840.

In an embodiment, social media network services 2870 may be provided. For example, matches transmitted from the server 2830 to the personal electronic devices 2810*a-c* can be displayed at the personal electronic devices 2810*a-c* within a tab, page, or application of a social media network. The display can be integrated with other services of the social media network. In a scenario where the services are within the Facebook® platform, media exposures of a user are displayed to other users or friends, who in turn can "like" the exposures, get connected to a webpages associated with the exposed media when the "like" button is clicked, or provide comments on the user's wall regarding the exposures. Similarly, data provided from the server 2830 to the provider 2840 can be used to generate banners, offers, coupons, or advertisements that are displayed within the tab, page, or application of the social media network.

Various other embodiments for providing applications or services based matched fingerprint data exist but are not shown in FIG. 28. For example, hearing impaired services can be provided, wherein a hearing impaired user can expose his or her device to an audio source. The server can return, in real-time or in substantially real-time, matches and lyrics or texts representing the audio that the device is exposed to. The returned data is displayed at the electronic device allowing the hearing impaired user to visually see or read his or her audio environment.

Another application is for speech recognition and audio commands. For example, a list of oral commands can be defined for controlling an instrument. When a user speaks a command, the speech can be recognized and matched to one of the oral commands, which is then executed to control the instrument. In yet another example, applications include video gaming or entertainment. For example, the techniques described herein above can be implemented within the frame work of a karaoke game. Users can compete to sing lyrics of a song, their singing can be fingerprinted and matched to performance of the original artists, and scores can be computed and provided to the users based on the number of matches.

Sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A system for generating a match between sets of data, the system comprising circuitry configured to:

divide a first list of fingerprints into a first set of windows, each window of the first set comprising fingerprints from the first list;

divide a second list of fingerprints into a second set of windows, each window of the second set comprising fingerprints from the second list;

compute an indicator for each fingerprint in each window, the indicator being associated with a location of the fingerprint in the window; and select a first window from the first set and a second window from the second set for comparison;

compare the first window to the second window, wherein the circuitry configured to compare includes circuitry configured to:

compute a number of bits that are different between a first fingerprint from the first window and a second fingerprint from the second window;

determine a weight associated with the number of bits that are different;

compare the weight to a threshold; and add the weight to a table based on the comparison, wherein the table comprises multiple weights associated with a comparison of fingerprints from the first and second windows, and wherein the weight is added at a location associated with a difference between an indicator of the first fingerprint and an indicator of the second fingerprint;

compute, based on the comparison, a first weight associated with the compared windows, wherein the first weight is based on a largest weight in the table;

determine that the first and second windows are a match based on a comparison of the first weight and a first threshold;

select, based on the determination, a fingerprint from the first or second window, wherein the fingerprint is selected from the first or second window based on a correlation between the largest weight and the selected fingerprint;

compute a time associated with when the selected fingerprint was generated;

insert the first weight and the time into a matrix;

determine a number associated with a frequency of occurrences of the time in the matrix;

determine a depth associated with a previous occurrence of the time in the matrix;

determine based on the number and the depth a second threshold;

sum first weights associated with the occurrences of the time in the matrix; and determine that the fingerprint is matched based on a comparison between the sum and the second threshold.

2. The system of claim 1, wherein the indicator is used to compute the time the fingerprint was generated.

3. The system of claim 1, wherein the previous occurrence is an oldest occurrence of the time in the matrix, and wherein the depth is a location of the oldest occurrence in the matrix.

4. The system of claim 1, wherein the circuitry comprises a field-programmable gate array.

5. The system of claim 1, wherein the first list of fingerprints is derived from data received from a remote device, wherein the data is associated with audio files detected at the remote device, and wherein a fingerprint from the first list is associated with an audio file from the audio files detected at the remote device.

6. The system of claim 5, wherein each fingerprint from the first list is derived from the data by selecting a number of bits from the data.

7. The system of claim 1, wherein the first list of fingerprints comprises fingerprints received from a remote device and associated with audio files detected at the remote device.

8. The system of claim 1, wherein the second list of fingerprints is derived from reference audio files, and wherein a fingerprint from the second list is associated with an audio file of the reference audio files.

9. The system of claim 1, wherein the first and second windows have different sizes.

10. The system of claim 1, wherein each computed indicator is added to the window comprising the fingerprint associated with the computed indicator.

11. The system of claim 1, wherein the first fingerprint comprises a first number of bits, and wherein the second fingerprint comprises a second number of bits.

12. The system of claim 11, wherein the first and second numbers are the same.

13. The system of claim 1, wherein computing the number of bits that are different between the first fingerprint and the second fingerprint comprises processing the first fingerprint and the second fingerprint through an XOR gate and summing the corresponding output bits of the XOR gate.

14. The system of claim 1, wherein setting the largest weight in the table as the first weight comprises setting the first weight to a default when the largest weight is smaller than the first threshold.

15. The system of claim 1, wherein adding the third weight to the location in the table comprises summing the third weight with an existing weight at the location.

16. The system of claim 1, wherein the table is a histogram that records third weight as a function of the indicator of the first fingerprint and the indicator of the second fingerprint.

17. The system of claim 1, wherein a length of the table corresponds to the sum of the number of fingerprints in the first window and the number of fingerprints in the second window.

18. The system of claim 1, wherein the matrix is a first-input-first-output matrix comprising a series of cells, wherein the series is updated with first weights and associated times derived from comparing windows in the first set of windows to the second window and associating the windows in the first set with the largest weights and associated locations in the table.

19. The system of claim 18, wherein the number of cells in the series is predefined, and wherein updating the series comprises:

shifting the information in each cell from the cell to another cell when a first weight and an associated time are inserted into the matrix; and inserting the first weight into a first blank cell and the associated time into a second blank cell, the blank cells being the result of the information shifting.

20. The system of claim 19, wherein the information is shifted between adjacent cells.

21. The system of claim 19, wherein the series is a series of time-sequential cells, wherein an updated cell is a first cell in the series, and wherein the information to be shifted from a last cell in the series is deleted.

22. The system of claim 18, wherein the series of cells comprises a first series of cells and a second series of cells, wherein each cell in the first series comprises a first weight, and wherein each cell in the second series comprises a time associated with a corresponding first weight.

23. The system of claim 1, wherein the second threshold is retrieved from a look-up table that defines thresholds as a function of depths.

24. The system of claim 1, wherein the second threshold is retrieved from a look-up table that defines thresholds as a function of depths and number of occurrences.

25. The system of claim 1, wherein the second window comprises reference fingerprints associated with reference audio.

26. The system of claim 1 further comprising circuitry configured to transmit information related to the matched fingerprint to a remote device in communication with the system over a network, wherein the transmission is in response to receiving fingerprints from the remote device, and wherein the received fingerprints are allocated to the first set of fingerprints.

27. A method executed on a device for comparing data, the method comprising:

dividing a first list of fingerprints into a first set of windows, each window of the first set comprising fingerprints from the first list;

dividing a second list of fingerprints into a second set of windows, each window of the second set comprising fingerprints from the second list;

computing an indicator for each fingerprint in each window, the indicator being associated with a location of the fingerprint in the window;

selecting a first window from the first set and a second window from the second set for comparison;

comparing the first window to the second window, wherein the comparison is performed by circuitry configured to:

compute a number of bits that are different between a first fingerprint from the first window and a second fingerprint from the second window;

determine a weight associated with the number of bits that are different;

compare the weight to a threshold; and add the weight to a table based on the comparison, wherein the table comprises multiple weights associated with a comparison of fingerprints from the first and second windows, and wherein the weight is added at a location associated with a difference between an indicator of the first fingerprint and an indicator of the second fingerprint;

computing, based on the comparison, a first weight associated with the compared windows, wherein the first weight is based on a largest weight in the table;

determining that the first and second windows are a match based on a comparison of the first weight and a first threshold;

selecting, based on the determination, a fingerprint from the first or second window, wherein the fingerprint is selected from the first or second window based on a correlation between the largest weight and the selected fingerprint;

computing a time associated with when the selected fingerprint was generated;

inserting the first weight and the time into a matrix;

determining a number associated with a frequency of occurrences of the time in the matrix;

determining a depth associated with a previous occurrence of the time in the matrix;

determining based on the number and the depth a second threshold;

summing first weights associated with the occurrences of the time in the matrix; and determining that the fingerprint is matched based on a comparison between the sum and the second threshold.

28. The method of claim 27, wherein the data is associated with audio detected at the remote device.

29. The method of claim 28, wherein the received digital signatures comprise bit streams, and wherein deriving the first fingerprints comprises detecting synchronization events in the bit streams.

30. The method of claim 29, wherein deriving the first fingerprints further comprises selecting a set of bits from the bit streams based on a predefined selection pattern.

31. The method of claim 28 further comprising:

receiving, from the remote device, information comprising timing information related to the digital signatures;

deriving information related to audio associated with the matched fingerprints;

deriving information related to a time when the audio was detected at the remote device based on the received timing information; and transmitting, to the remote device, information comprising the information related to the audio and the information related to the time.

32. The method of claim 31, wherein the received information further comprises context data associated with the remote device and a user of the remote device, and wherein the transmitted information further comprises services based on the context data.

33. The method of claim 32 further comprising transmitting, to a computing device associated with a second user, information related to matched fingerprints, the timing information, and the context data.

34. The method of claim 32 further comprising:

retrieving information related to the match based on the matched second fingerprint; and transmitting the information to the remote device.

35. A computer readable storage medium having stored thereon instructions that when executed by a system cause the system to compare data, the instructions comprising instructions to:

compare a first window to a second window, the first window comprising a list of first fingerprints, and a list of first indicators indicative of locations in the first window of the first fingerprints, the first fingerprints being associated with a remote device, the second window comprising a list of second fingerprints and a list of second indicators indicative of locations in the second window of the second fingerprints, the comparison comprising:

determining similarities between the first and second fingerprints;

computing relative indicators based on the first and second indicators; and associating the similarities with the relative indicators;

allocate a first weight to the first window based on the similarities and the relative indicators; and determine that there is a match between at least a fingerprint from the first fingerprints and at least a fingerprint from the second fingerprints based on the first weight and a second weight generated by comparing the second window to another window comprising a list of third fingerprints, the third fingerprints being associated with the remote device;

wherein the first window is included in a block comprising a plurality of first windows, and wherein the plurality of first windows comprise fingerprints derived from data received from the remote device and associated with audio detected at the remote device, wherein the second window is included in a block comprising a plurality of second windows, and the plurality of second windows comprise fingerprints associated with reference audio;

wherein the instructions further comprise instructions to compare each first window of the plurality of first windows to each second window of the plurality of second windows, wherein the comparison of a first window to a second window and the comparison of another first window to another second window are executed in parallel; and wherein the block comprising the plurality of first windows comprises up to 300 million fingerprints, wherein the block comprising the plurality of second windows comprises at least 10 million fingerprints, and wherein the comparison of each first window of the plurality of first windows to each second window of the plurality of second windows is completed in less than 9,600 seconds.

36. The computer readable storage medium of claim 35, wherein the first windows have a same number of fingerprints.

37. The computer readable storage medium of claim 35, wherein the second windows have a same number of fingerprints.

38. The computer readable storage medium of claim 35, wherein each first window has a first number of fingerprints and each second window has a second number of fingerprints, and wherein the first number is different than the second number.

39. The computer readable storage medium of claim 38, wherein the first number and the second number are adjusted based on a condition of the system.

40. The computer readable storage medium of claim 38, wherein the second number is adjusted based on the first number.

41. The computer readable storage medium of claim 38, wherein the first number and the second number are adjusted based on bit lengths of the fingerprints.

* * * * *